United States Patent
Takishima et al.

(10) Patent No.: US 6,285,484 B1
(45) Date of Patent: Sep. 4, 2001

(54) ROTATION DETECTING SYSTEM FOR GALVANO MIRROR

(75) Inventors: Suguru Takishima, Tokyo; Toshio Nakagishi, Saitama-ken, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/492,823

(22) Filed: Jan. 27, 2000

Related U.S. Application Data

(63) Continuation of application No. 09/102,272, filed on Jun. 22, 1998.

(30) Foreign Application Priority Data

Jun. 27, 1997 (JP) .................................................... 9-172063
Oct. 15, 1997 (JP) .................................................... 9-281550
Oct. 15, 1997 (JP) .................................................... 9-281551

(51) Int. Cl.[7] .................................................... G02B 26/08
(52) U.S. Cl. .................... 359/198; 359/197; 359/200; 359/214; 250/236; 369/44.17
(58) Field of Search .................................. 359/196–198, 359/200, 213, 214; 250/236, 230; 369/44.17, 44.12

(56) References Cited

U.S. PATENT DOCUMENTS

| 2,750,461 | 6/1956 | Bunch . |
| 3,244,917 | 4/1966 | Gute . |
| 3,354,833 | 11/1967 | Laing . |

(List continued on next page.)

FOREIGN PATENT DOCUMENTS

| 0448362 A | * 5/1982 | (EP) | .............................. G01D/4/30 |
| 0084727 | * 8/1983 | (EP) | . |
| 0084728 | * 8/1983 | (EP) | . |

(List continued on next page.)

OTHER PUBLICATIONS

Patent Abstracts of Japan, vol. 012, No. 140 (P–696), dated Apr. 18, 1988.*
Patent Abstracts of Japan, vol. 017, No. 505 (P–1611), dated Sep. 1993.*
An article entitled "Optical Magnetic Disk Device Of U.S. TeraStor Succeeds Tracking Cotrol—Track Pitch Of 0.34 $\mu$m Realized Using Two–Stage Servo", which appeared at pp. 13 and 14 of the Japanese language magazine *Nikkei Electronics*,.*
Sep. 22, 1997 (No. 699).
An article entitled "Trillions Of Bytes", by Eric Nee, which appeared in the Mar. 24, 1997 issue of Forbes magazine.
A screen capture of a page from TeraStor's website (dated Mar. 19, 1997) entitled "Architecture of TeraStor's Near–Field Technology".

(List continued on next page.)

*Primary Examiner*—Darren Schuberg
*Assistant Examiner*—Fayez Assaf
(74) *Attorney, Agent, or Firm*—Greenblum & Bernstein, P.L.C.

(57) ABSTRACT

A galvano mirror system includes (1) a galvano mirror, (2) a mirror holder having a front portion to which the galvano mirror is mounted and a rear portion opposing to the front portion, (3) a stator which rotatably supports the mirror holder, (4) first and second reflecting surfaces provided to the rear portion of the mirror holder, and (5) first and second photo sensors provided to the stator. Each photo sensor includes a light-emitting device and a light-receiving device. A controller of the galvano mirror system detects the rotational position of the mirror holder according to on a difference in outputs of the light-receiving devices of the first and second photo sensors.

9 Claims, 24 Drawing Sheets

U.S. PATENT DOCUMENTS

| | | |
|---|---|---|
| 4,088,914 | 5/1978 | Aoki . |
| 4,126,796 | 11/1978 | Ito . |
| 4,206,379 | 6/1980 | Owda . |
| 4,285,566 | 8/1981 | Yamamoto . |
| 4,297,713 | 10/1981 | Ichikawa et al. . |
| 4,351,596 | 9/1982 | Ohniwa et al . |
| 4,466,088 * | 8/1984 | Trethewey ............................... 369/46 |
| 4,891,998 | 1/1990 | Tourville . |
| 4,959,824 | 9/1990 | Ueda . |
| 4,968,876 | 11/1990 | Iima . |
| 5,125,750 | 6/1992 | Corle et al. . |
| 5,126,899 | 6/1992 | Kanazawa . |
| 5,136,559 | 8/1992 | Nakayama . |
| 5,151,890 | 9/1992 | Yonekubo . |
| 5,220,550 | 6/1993 | Nakayama . |
| 5,254,893 | 10/1993 | Ide . |
| 5,365,504 | 11/1994 | Noguchi . |
| 5,420,848 | 5/1995 | Date et al. . |
| 5,422,872 | 6/1995 | Hsu et al. . |
| 5,444,683 | 8/1995 | Ishikawa . |
| 5,461,498 | 10/1995 | Iwao . |
| 5,517,474 | 5/1996 | Takamine . |
| 5,532,480 | 7/1996 | Scofield . |
| 5,564,585 | 10/1996 | Saitoh . |
| 5,596,446 | 1/1997 | Plesko . |
| 5,608,280 | 3/1997 | Tamemoto et al. . |
| 5,610,752 | 3/1997 | Hayakawa . |
| 5,625,244 | 4/1997 | Bradfield . |
| 5,684,762 | 11/1997 | Kubo . |
| 5,705,868 | 1/1998 | Cox et al. . |
| 5,719,834 | 2/1998 | Futagawa et al. . |
| 5,764,613 | 6/1998 | Yamamoto . |
| 5,768,241 | 6/1998 | Kanazawa et al. . |
| 5,844,676 | 12/1998 | Southam et al. . |
| 5,886,438 | 3/1999 | Kawanishi . |
| 5,920,140 | 7/1999 | Nakagishi et al. . |

FOREIGN PATENT DOCUMENTS

| | | | |
|---|---|---|---|
| 0448362 * | 9/1991 | (EP) . | |
| 0790512 * | 8/1997 | (EP) . | |
| 0907163 * | 4/1999 | (EP) . | |
| 378922 * | 8/1932 | (GB) . | |
| 1314002 * | 4/1973 | (GB) . | |
| 1457995 * | 12/1976 | (GB) . | |
| 2000604 * | 1/1979 | (GB) . | |
| 2086092 * | 5/1982 | (GB) . | |
| 2086092 A * | 5/1982 | (GB) .............................. | G11B/7/08 |
| 2193341 * | 2/1988 | (GB) . | |
| 62262017 * | 11/1987 | (JP) . | |
| 64-2015 * | 1/1989 | (JP) . | |
| 5128561 * | 5/1993 | (JP) . | |
| 8315404 * | 11/1996 | (JP) . | |
| 90/08363 * | 7/1990 | (WO) . | |
| 98/06095 * | 2/1998 | (WO) . | |
| 98/49675 * | 11/1998 | (WO) . | |
| 98/49684 * | 11/1998 | (WO) . | |

OTHER PUBLICATIONS

An article entitled "In 1998, 10 GB Per Inch$^2$ Is Realized Using New Optical Recording Technology", appeared at pp. 148–151 of the Sep., 1997 Japanese language edition of Nikkei Byte magazine.

An article by B.D. Terris et al., entitled "Near–Field Optical Data Storage", Applied Physics Letters, vol. 68, pp. 141–143, Jan. 8, 1996.

* cited by examiner rear ⇐         ⇒ front

ROTATION DETECTING SYSTEM FOR GALVANO MIRROR

This application is a continuation of application Ser. No. 09/102,272, filed Jun. 22, 1998, the entire disclosure of which is expressly incorporated by reference herein in its entirety.

BACKGROUND OF THE INVENTION

This invention relates to an optical disk drive.

Generally, an optical disk drive writes and reads data on an optical disk by means of a laser beam. The optical disk drive includes a light source module that emits the laser beam and an optical head carrying an object lens that converges the laser beam on a small light spot on the optical disk.

The tracking operation of the optical disk drive includes (1) a rough tracking operation and (2) a fine tracking operation. The rough tracking operation is accomplished by moving the optical head crossing the tracks of the optical disk. The fine tracking operation is accomplished by minutely moving the light spot on the optical disk. For this purpose, a galvano mirror is provided in a light path between the light source module and the object lens. By rotating the galvano mirror, the angle of incidence of the laser beam entering the object lens is changed, so that the light spot on the optical disk is moved.

FIGS. 1A and 1B are a perspective view and a side view of a conventional galvano mirror system. The galvano mirror 44 is mounted to a mirror holder 42. The mirror holder 42 is supported by a stator 41 via plate springs 43 so that the mirror holder 42 is rotatable about a rotation axis P. In order to actuate the galvano mirror 44, a coil 45 is fixed to the mirror holder 42. A magnet yoke 46 is provided to the stator 41, which generates a magnetic field in which the coil 45 is positioned. When current flows in the coil 45, the galvano mirror 44 is rotated as shown by A in FIG. 1B, due to an electromagnetic induction caused by the current flow in the coil 45 and the magnetic field caused by the magnets of the yoke 46.

In order to detect the rotation of the galvano mirror 44, a reflecting surface 50 is formed on one of side faces of the mirror holder 42. Further, a photo-sensor 49 is provided to a circuit board 47 fixed to the stator 41 so that the photo-sensor 49 is faced with the reflecting surface 50. The photo-sensor 49 includes an LED chip 49A and two photo-transistors 49B. The LED chip 49A and the photo-transistors 49B are disposed on a line that is perpendicular to the rotation axis of the mirror holder 42. The two photo-transistors 49B are located on both sides of the LED chip 49A (on the above-mentioned line).

In a state the reflecting surface 50 is in parallel to the photo-sensor 49, the lights emitted from the LED chip 49A and reflected by the reflecting surface 50 equally reach two photo-transistors 49B. When the mirror holder 42 is rotated as shown by A in FIG. 1B, light entering one of the photo-transistor 49B is increased, while light entering the other photo-transistor 49B is decreased. Thus, the rotation amount of the galvano mirror 44 can be detected by measuring the difference in outputs of two photo-transistors 49B.

However, since the reflecting surface is provided to one of side faces of the mirror holder 42, such a conventional galvano mirror system has a disadvantage such that an arrangement of the photo-sensor occupies relatively large space.

Further, if there is a difference in sensitivities of the photo-transistors 49B, it may cause an offset. That is, there is a possibility that the outputs of two photo-transistors 49B are not equal with each other, even if the reflecting surface 50 is in parallel to the photo-sensor 49. In the conventional galvano mirror system, it is difficult to remove such offset.

SUMMARY OF THE INVENTION

It is therefore an object of the present invention to provide a galvano mirror system that is compact in size and capable of detecting the rotation of a galvano mirror. It is another object of the present invention to provide a galvano mirror system wherein it is easy to remove an offset caused by a difference in sensitivity of sensors.

According to one aspect of the present invention, there is provided a galvano mirror system including (1) a galvano mirror having a mirror surface which reflects light for data to reading and data writing, (2) a mirror holder having a front portion to which the galvano mirror is mounted and a rear portion opposing to the front portion, (3) a stator which rotatably supports the mirror holder, (4) first and second reflecting surfaces provided to the rear portion of the mirror holder, (5) first and second photo sensors provided to the stator so that the first and second photo sensors are respectively faced with the first and second reflecting surfaces, each of the photo sensors comprising a light-emitting device and a light-receiving device, and (6) a controller which detects a rotation of the mirror holder according to a difference between outputs of the light-receiving devices of the first and second photo sensors.

With such an arrangement, since the first and second reflecting surfaces are provided to the rear portion of the mirror holder, the first and second photo-sensors (which are faced with the reflecting surfaces) can be located at the rear of the mirror holder. Thus, the space for the arrangement of the photo sensors can be relatively small.

In a particular arrangement, the light-emitting devices and the light-receiving devices (of the first and second photo sensors) are disposed in a certain direction that is perpendicular to a rotation axis of the mirror holder. Further, the first and second reflecting surfaces are disposed in the above-mentioned certain direction.

Optionally, the light-emitting devices (of the first and second photo sensors) are located on both sides of the light-receiving devices (of the first and second photo sensors) in the above-mentioned certain direction. Such arrangement prevents external light from entering the light-receiving devices.

Further optionally, the photo sensors can be fixed to a sensor holder mounted to the stator. The position of the sensor holder with respect to the mirror holder can be adjusted in the above-mentioned certain direction. If the position of the sensor holder is changed (with respect to the mirror holder), the positional relationship between each photo sensor and the corresponding reflecting surface is varied. Thus, even if there is a difference in sensitivities of the light-receiving devices, an offset caused by the difference (in sensitivities) can be easily removed by adjusting the position of the sensor holder.

According to another aspect of the present invention, there is provided a galvano mirror system including (1) a galvano mirror, (2) a mirror holder having a front portion to which the galvano mirror is mounted and a rear portion opposing to the front portion, (3) a stator which rotatably supports the mirror holder, (4) a reflecting surface provided to the rear portion of the mirror holder, (5) a photo sensor provided to the stator so that the photo sensor is faced with the reflecting surface, the. photo sensor comprising a light-emitting device and two light-receiving devices, and (6) a controller which detects the rotation of the mirror holder according to a difference in outputs of two light-receiving devices.

With such an arrangement, since the reflecting surface is provided to the rear portion of the mirror holder, the photosensor (which is faced with the reflecting surface) can be located at the rear of the mirror holder. Thus, the space for the arrangement of the photo sensor can be relatively small.

In a particular arrangement, a recess is formed at the rear portion of the mirror holder. In such case, the reflecting surface is formed on an end surface of a lib formed in the recess.

According to further aspect of the present invention, there is provided a galvano mirror system including (1) a galvano mirror having a front surface which reflects laser beam for data reading and data writing and a rear surface opposing to the front surface, (2) a mirror holder having a front portion (to which the galvano mirror is mounted) and a rear portion opposing to the front portion, (3) a stator which rotatably supports the mirror holder, (4) a reflecting surface provided to the rear surface of the galvano mirror, (5) a photo sensor provided to the stator so that the photo sensor is faced with the reflecting surface, the photo sensor comprising a light-emitting device and two light-receiving devices, and (6) a controller which detects the rotation of the mirror holder according to a difference in outputs of the two light-receiving devices.

BRIEF DESCRIPTION OF THE DRAWINGS

FIGS. 21A and 4B are diagrams respectively showing outputs of photo sensors and a differentiate amplifier;

DESCRIPTION OF THE PREFERRED EMBODIMENT

First, an optical disk drive to which the first to third embodiments of the present invention are embodied is described.

Figure 1A:
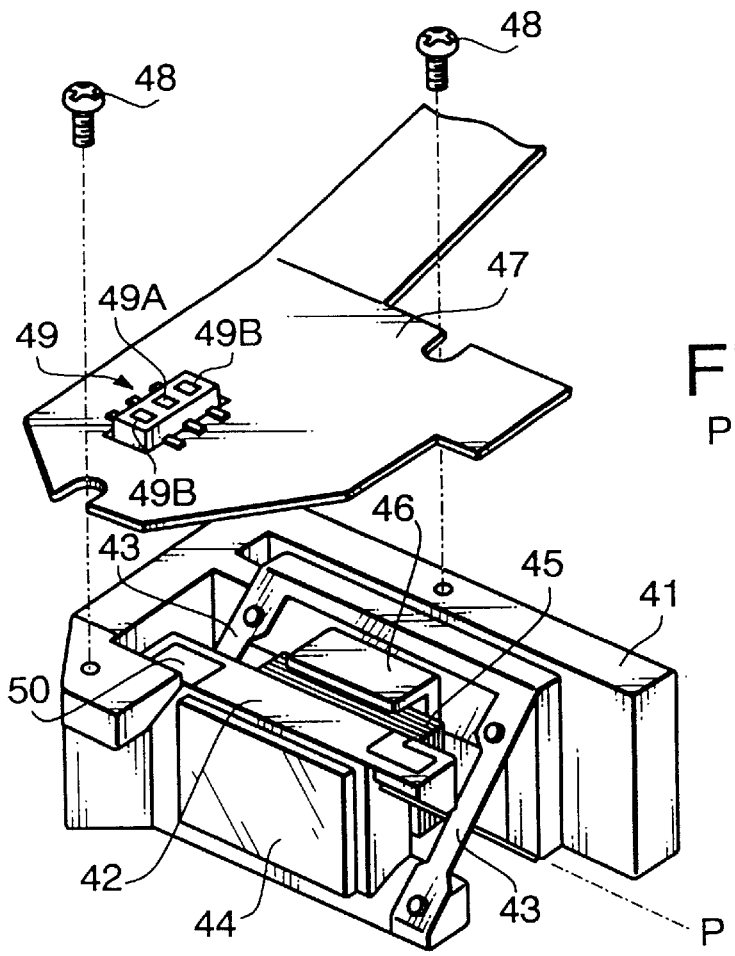
FIGS. 1A and 1B are an exploded perspective view and a side view of a conventional galvano mirror system.
Figure 1B:
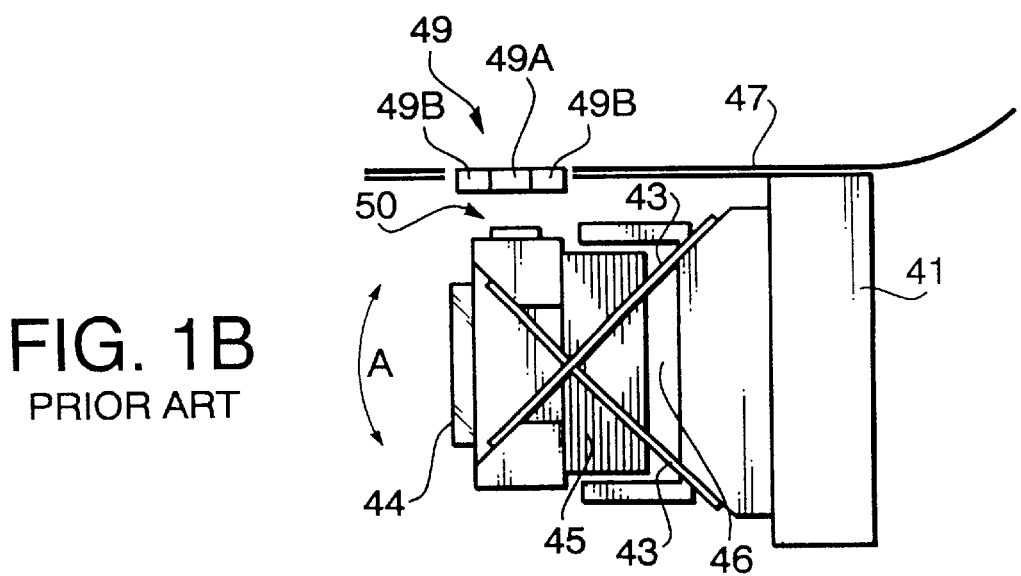
Figure 2:
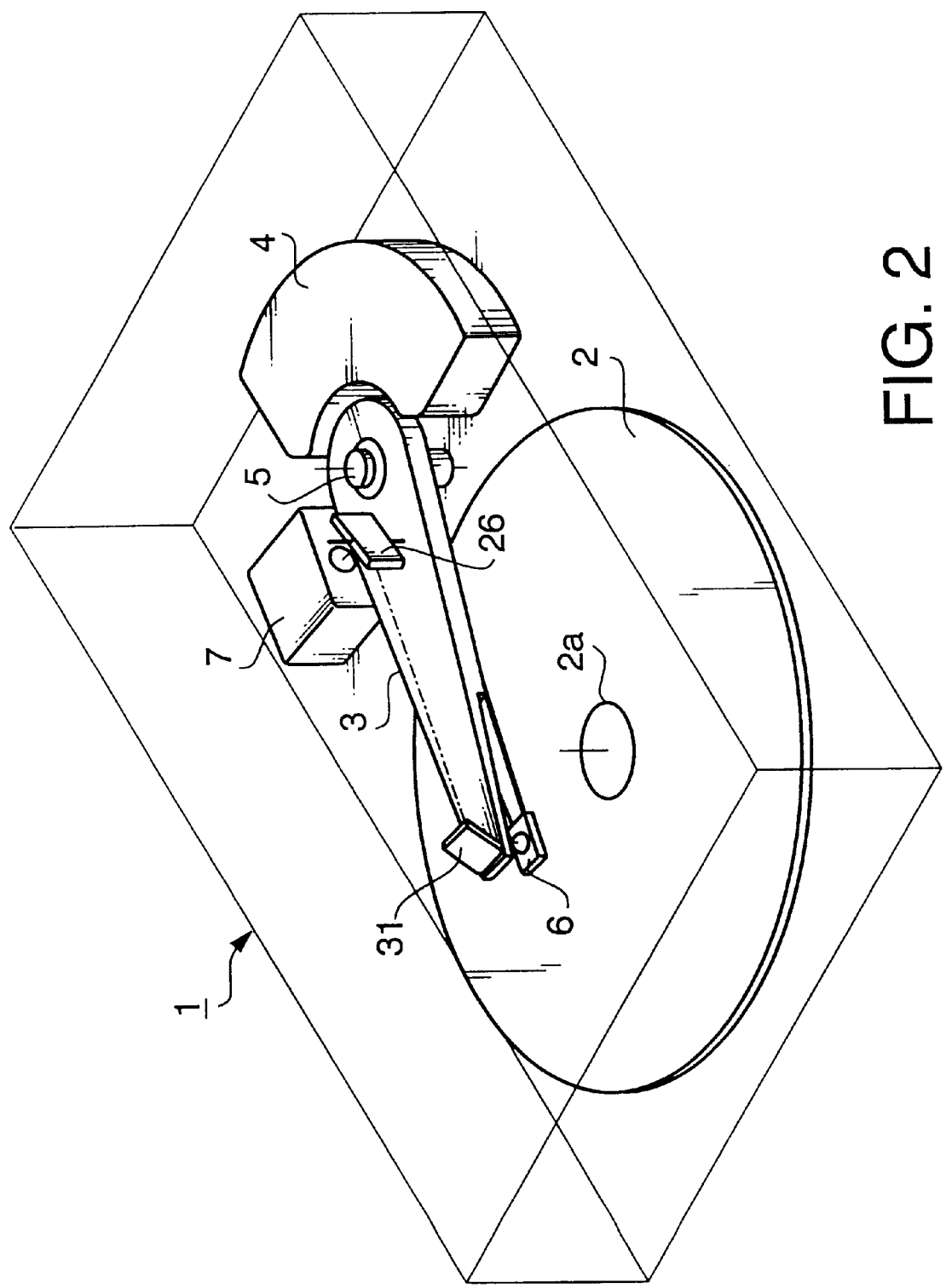
FIG. 2 is a perspective view of a disk drive to which a first to third embodiment are applied.

FIG. 2 is a perspective view of the optical disk drive (hereinafter, the disk drive 1). The disk drive 1 is arranged to write and read data on an optical disk 2 by means of a so-called Near Field Recording (NFR) technology.

In the disk drive 1, the optical disk 2 is mounted to a rotating shaft 2a of a not-shown spindle motor. The disk drive 1 includes a rotary arm 3 extending in parallel to a surface of the optical disk 2, and is rotatably supported by a shaft 5. A floating head 6 that carries an optical lens (described later) is provided to a tip of the rotary arm 3. When the rotary arm 3 is rotated, the floating head 6 moves across tracks formed on the optical disk 2. The rotary arm 3 is further provided with a light source module 7 in the vicinity of the shaft 5.

Figure 3:
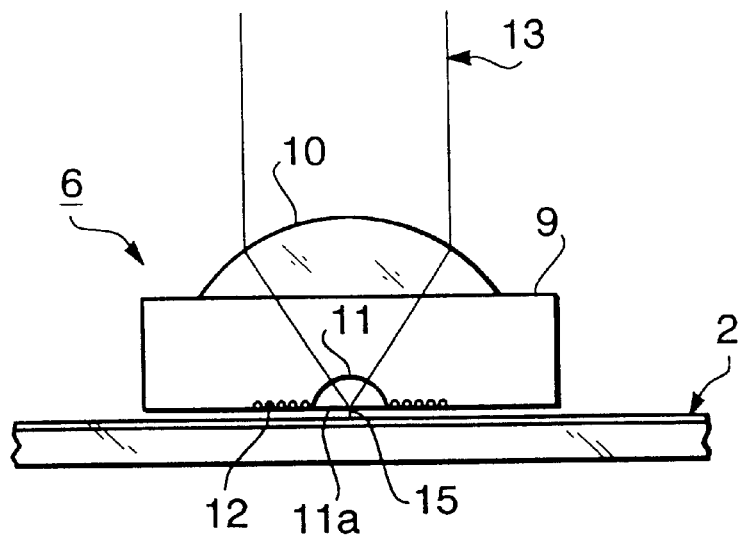
FIG. 3 is a side view showing a floating head of the disk drive of FIG. 2.
Figure 4:
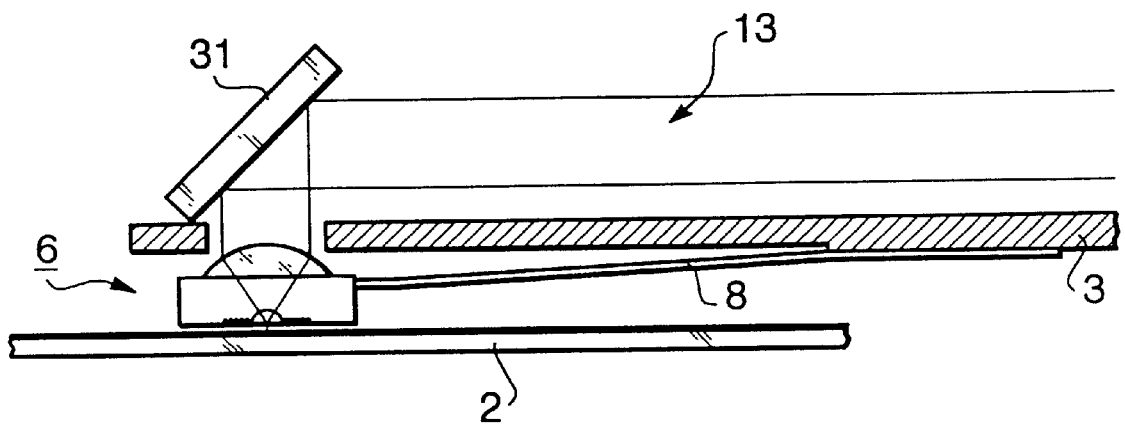
FIG. 4 is a sectional view showing a tip of a rotary arm of the disk drive of FIG. 2.

FIG. 3 is an enlarged view of the floating head 6. FIG. 4 is an enlarged view of the tip of the rotary arm 3. As shown in FIG. 4, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disk 2 rotates, the floating head 6 is lifted upward by air flow generated between the optical disk 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIGS. 3 and 4, the floating head 6 includes an object lens 10 and a solid immersion lens (SIL) 11. A reflecting mirror 31 is provided to the rotary arm 3, which reflects the laser beam 13 emitted from the light source module 7 (FIG. 4) to the object lens 10. The object lens 10 converges the laser beam 13. The solid immersion lens 11 is a half-spherical lens and the plane surface thereof is faced with the optical disk 2. Further, the focal point of the object lens 10 is positioned on the plane surface of the solid immersion lens 11. That is, the laser beam 13 is converged on the plane surface 11a of the solid immersion lens 11. Since the clearance of the optical disk and the plane surface 11a of the solid immersion lens 11 is less than 1 μm, the converged laser beam is converted to a so-called evanescent beam (which propagates across a small gap between closely disposed surfaces) and reaches the optical disk 2. Since the beam diameter of the evanescent beam is smaller than the converged laser beam, a data storage capacity can be remarkably increased.

In order to apply magnetic field on the surface of the optical disk 2, a coil 12 is provided around the solid immersion lens 11. A current follow in the coil 12 generates a magnetic field in which the optical disk 2 is positioned. Data writing is performed by the evanescent beam from the solid immersion lens 11 and the magnetic field generated by the coil 12.

Figure 5:
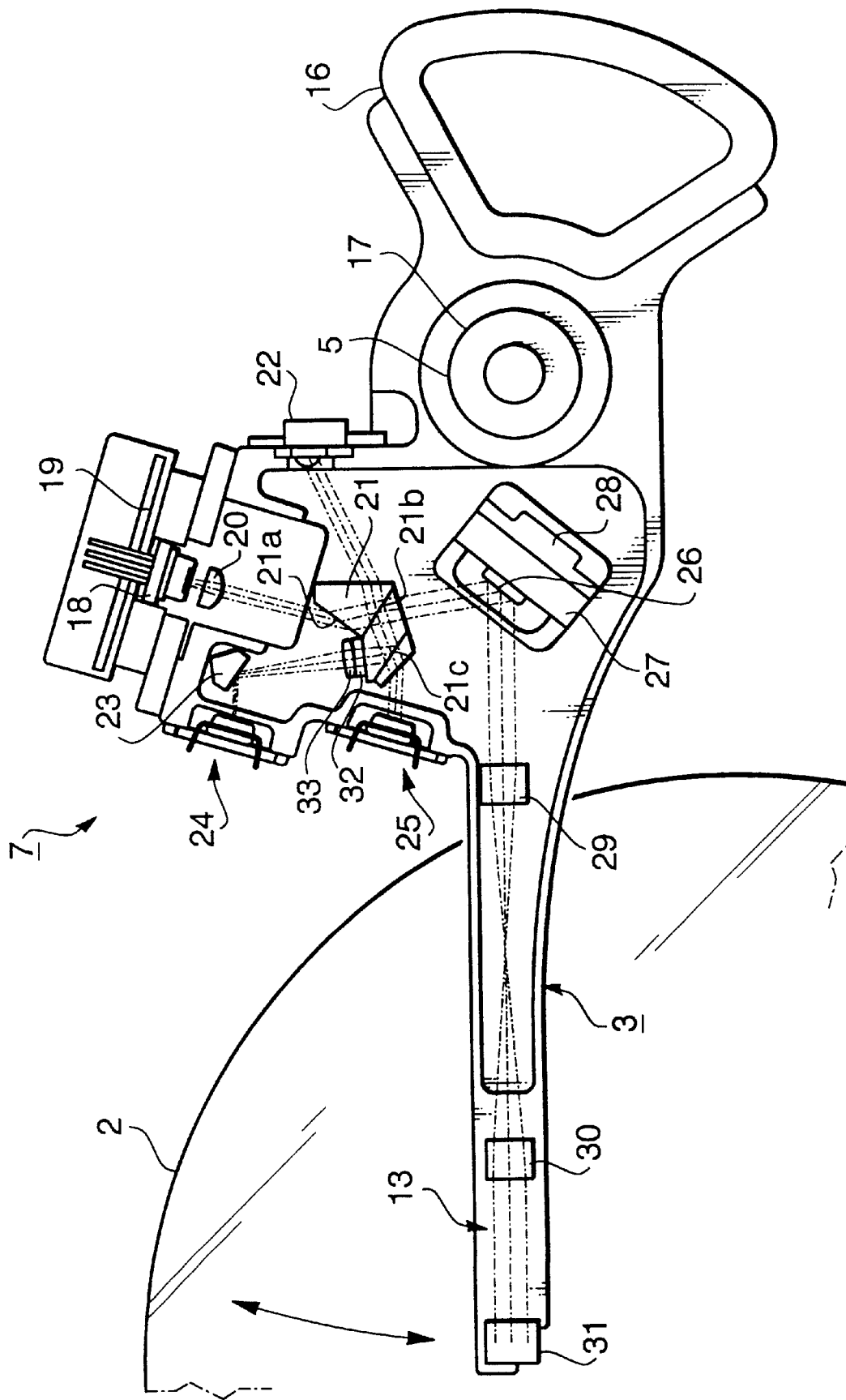
FIG. 5 is a plan view of the rotary arm of the disk drive of FIG. 2.
Figure 6:
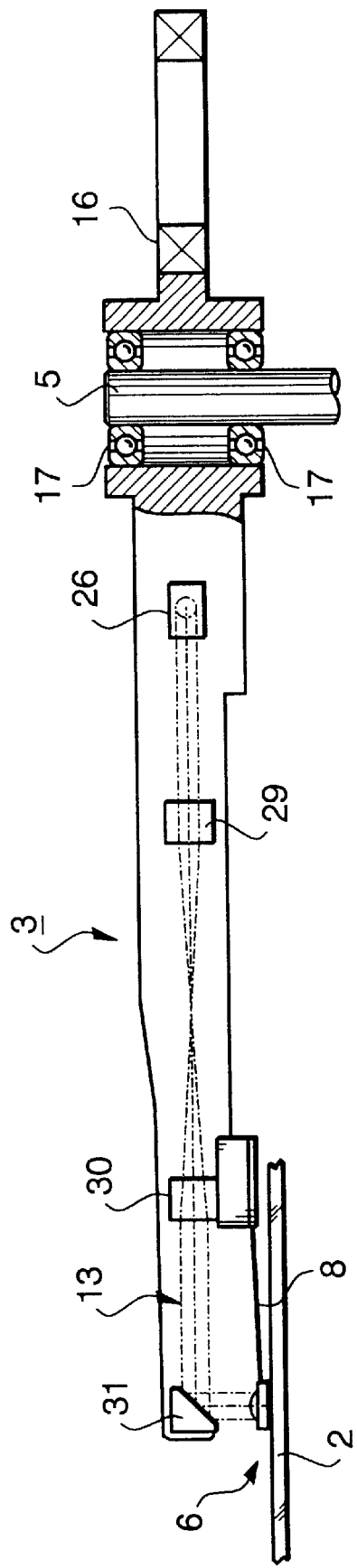
FIG. 6 is a sectional view of the rotary arm of FIG. 5.

FIGS. 5 and 6 are a plan view and a sectional view of the rotary arm 3. As shown in FIGS. 5 and 6, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 2). The rotary arm 3 is supported by the shaft 5 via bearings 17. When current flows in the driving coil 16, the rotary arm 3 is rotated about the axis 5, due to the electromagnetic induction.

As shown in FIGS. 5 and 6, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disk 2. For this purpose, a galvano mirror 26 is provided in a light path between the light source module 7 and the object lens 10. In particular, the galvano mirror 26 is locate so that the laser beam 13 emitted from the laser source module 7 directly enters. The laser beam 13 reflected by the galvano mirror 26 proceeds to the reflection mirror 31 and is reflected (by the reflection mirror 31) to the floating head 6. Then, the laser beam 13 is converged and incident on the optical disk 2. By rotating the galvano mirror 26, the incident angle of the laser beam 13 incident on the object lens 10 is changed, so that the light spot on the optical disk 2 is moved. The rotating angle of the galvano mirror 26 is detected by a galvano mirror positioning sensor 28 located in the vicinity of the galvano mirror 26.

When the galvano mirror 26 rotates to change the incident angle of the laser beam 13 incident on the object lens 10, there is a possibility that the laser beam 13 partially fails to enter the object lens 10. In order to solve this problem, first and second relay lenses 29 and 30 are provided between the galvano mirror 26 and the reflection lens 31 to obtain the conjugate relationship between a principal plane of the object lens 10 and the center of the mirror surface of the galvano mirror 26 (in the vicinity of the rotation axis thereof). With this, the laser beam 13 reflected by the galvano mirror 26 is surely enter the objective lens 10 irrespective of the rotation of the galvano mirror 26.

The laser beam 13 that has returned from the surface of the optical disk 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam that transmits the second half mirror surface 21c is directed to the tracking detection sensor 25. The tracking detection sensor 25 outputs a track error signal based on the incident laser beam. The laser beam that has reflected by the second half mirror surface 21c is polarized by a Wollaston polarizing prism 32, generating two polarized beams. The polarized beams are converged (by a converging lens 33) on the data detection sensor 24. The data detection sensor 24 has two light receiving portions which respectively receives two polarized beams. With this, the data detection sensor 24 reads data recorded on the optical disk 2. In particular, the data signal from the tracking detection sensor 25 and data detection sensor 24 are generated by a not-shown amplifier circuit and sent to a not-shown control circuit.

[First Embodiment]

Figure 7:
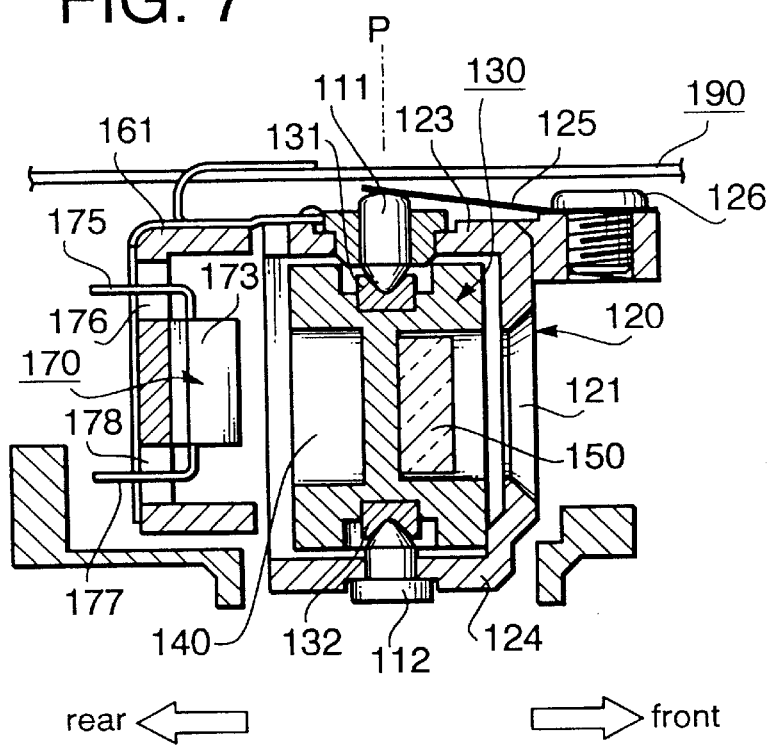
FIG. 7 is a sectional view of a galvano mirror system according to the first embodiment.

FIG. 7 is a longitudinal sectional view of a galvano mirror arrangement according to the first embodiment. In the first embodiment, the above mentioned galvano mirror 26 (FIG. 2) is referred to as a 'galvano mirror 150'.

As shown in FIG. 7, the galvano mirror 150 is mounted to a mirror holder 130 that is supported in a stator 120. Hereinafter, the galvano mirror side of the mirror holder 130 is referred to as 'front', while an opposing side thereof is referred to as 'rear'. The stator 120 has an opening 121 at the front end thereof, which allows light (for data writing and data reading) to enter the front surface of the galvano mirror 150.

The stator 120 includes a top plate 123 and a bottom plate 124. In order to rotatably support the mirror holder 130, center pins 111 and 112 are respectively provided to the top and bottom plates 123 and 124. The center pins 111 and 112 are aligned on a line defining a rotation axis P of the mirror holder 130. The mirror holder 130 is provided with a pair of receive members 131 and 132 that respectively receive the center pins 111 and 112. Each of the center pins 111 and 112 has a conical portion with a rounded apex. Each of the receive members 131 and 132 has conical surface. The mirror holder 130 is pivoted due to the contacts of the rounded apexes of the center pins 111 and 112 and the conical surfaces of the receive members 131 and 132. In order to eliminate backlash, a plate spring 125 is fixed to the top of the stator 120 (via a fixing screw 126), which biases the upper center pin 111 to the upper receive member 131.

Figure 8:
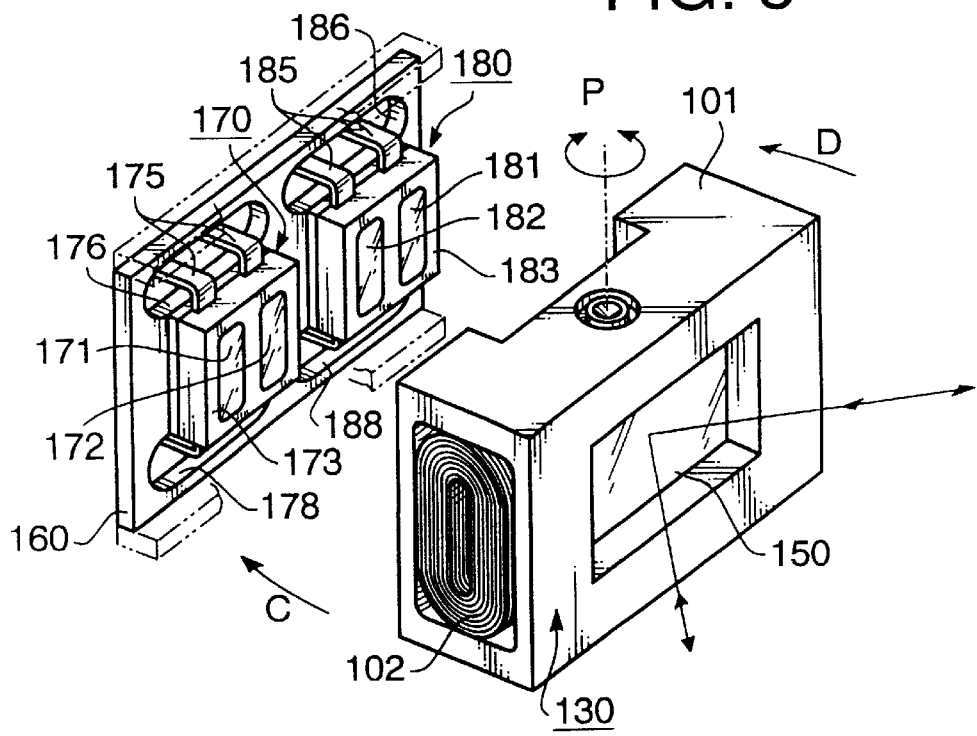
FIG. 8 is an exploded perspective view of the galvano mirror system of FIG. 7.
Figure 9:
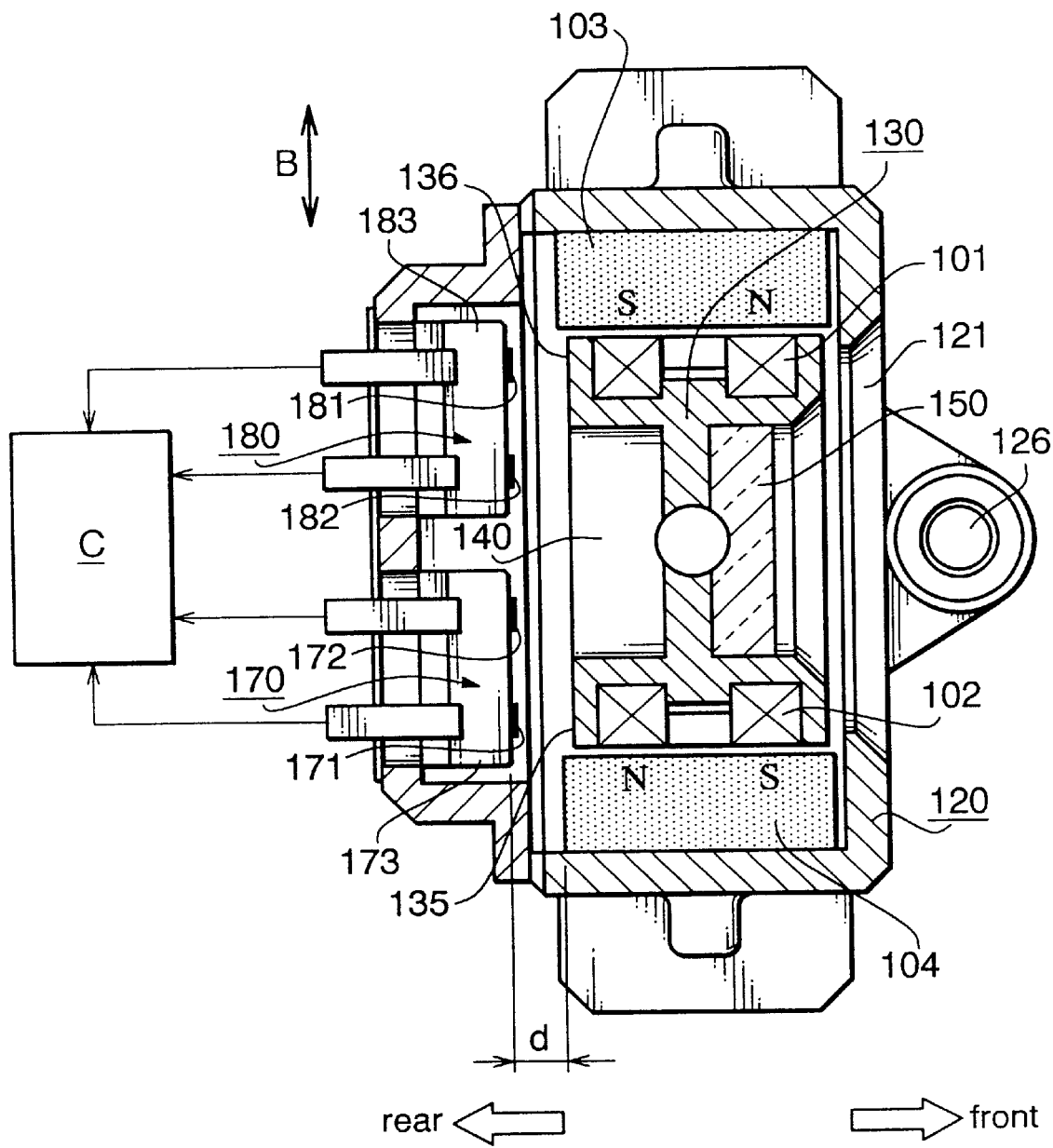
FIG. 9 is a plan view of the galvano mirror system of FIG. 7.

FIGS. 8 and 9 are a perspective view and a horizontal sectional view of the galvano mirror system. As shown in In FIG. 8, a pair of driving coils 101 and 102 are provided to lateral side ends of the mirror holder 130. As shown in FIG. 9, a pair of driving magnets 103 and 104 are provided to the stator 120 so that the driving magnets 103 and 104 are respectively faced with the driving coils 101 and 102. By allowing current to flow in the driving coils 101 and 102, the mirror holder 130 is rotated about the rotation axis P due to an electromagnetic induction.

As shown in FIG. 9, a recess 140 is formed on the rear portion of the mirror holder 130. A pair of reflecting surfaces 135 and 136 are formed on shoulder portions which are formed on both sides of the recess 170. The reflecting surfaces 135 and 136 can be made of any material which reflects light from LED chips 171 and 181 described below. In particular, if the mirror holder 130 is made of a black material, the reflecting surfaces can be made by coating white material (or by attaching white tapes) on the shoulder portions of the mirror holder 130.

A photo sensor holder 160 is provided at the rear of the stator 120. Two photo sensors 170 and 180 are provided to the photo sensor holder 160, so that the photo sensors are faced with the reflecting surfaces 135 and 136 of the mirror holder 130. The photo sensor 170 includes a LED chips 171 which emits light and a photo transistor 172 which receives light. The LED chip 171 and the photo transistor 172 are accommodated in a package 173. Similarly, the photo sensor 180 includes a LED chips 181 which emits light and a photo transistor 182 which receives light. The LED chips 181 and the photo transistor 182 are accommodated in a package 183. The LED chips 171 and 181 and the photo transistor 172 and 182 are aligned on a same plane.

Figure 10:
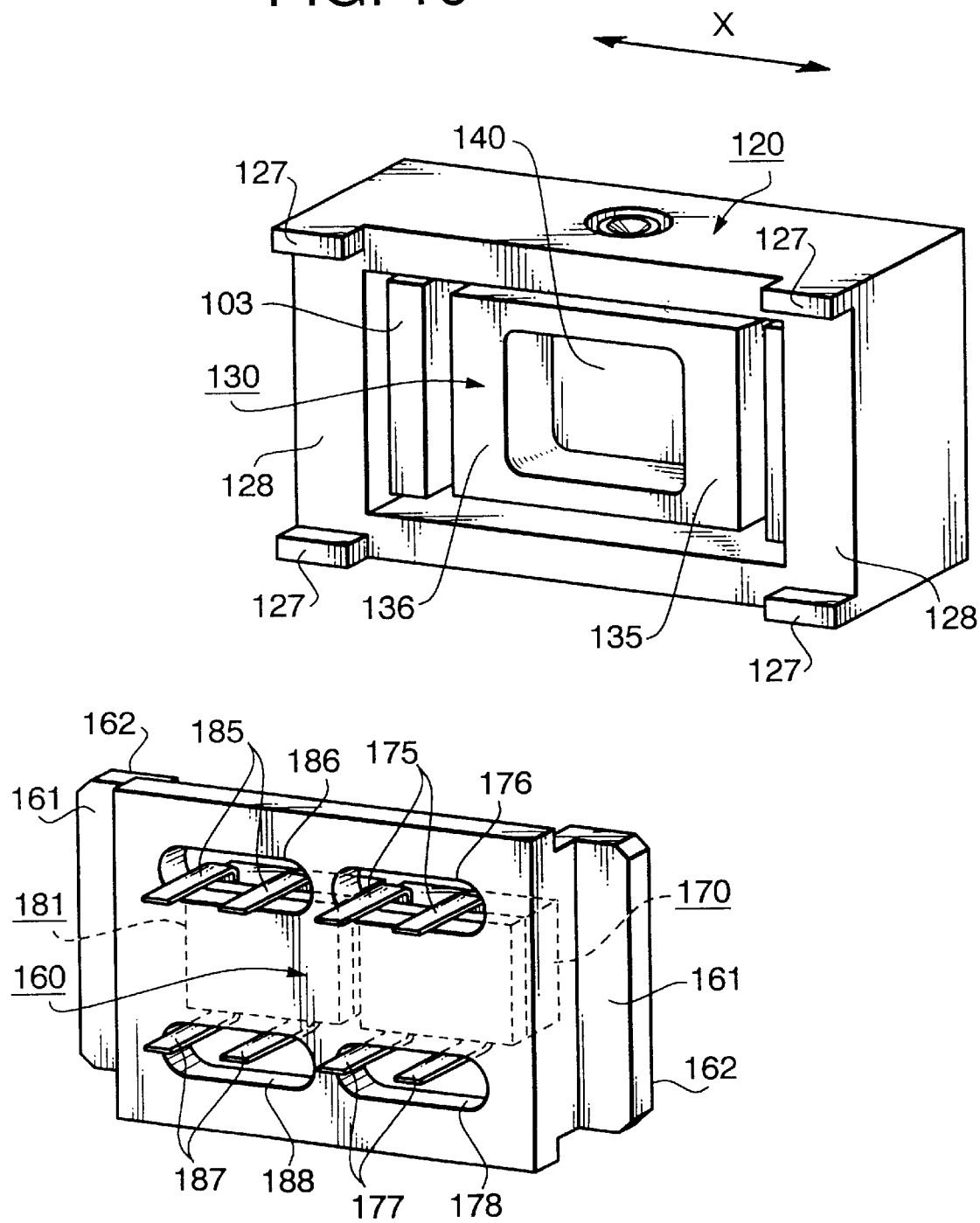
FIG. 10 is an exploded perspective view of the galvano mirror system of FIG. 7.

FIG. 10 is an exploded perspective view of the galvano mirror system. The photo sensors 170 and 180 are electrically connected to a controller C (FIG. 9). For this purpose, the photo sensor holder 160 is provided with four openings 176 and 178 186 and 188. Connecting members 175, 177, 185 and 187 are rearward extended from the photo sensors 170 and 180 to the exterior through the openings 176 and 178 186 and 188. In order to mount the photo sensor holder 160 to the stator 120, the photo sensor holder 160 is provided with engaging walls 161 formed at both side ends thereof. The stator 120 is provided with four guide projections 127 projected rearward from the top and bottom of lateral side ends thereof. When the photo sensor holder 160 is mounted to the stator 120, each engaging wall 161 is received by two guide projections 127. The photo sensor holder 160 has a pair of contact surfaces 162 which contacts the rear surfaces 128 of the stator 120. The contact surfaces 162 are parallel to the front surfaces of the photo sensors 170 and 180. Due to the slide contact of the contact surfaces 162 of the photo sensor holder 160 and the rear surface 128 of the stator 120, the photo sensor holder 160 can be slid with respect to the stator 120.

The LED chips 171 and 181 and the photo transistors 172 and 182 are disposed in a line that is perpendicular to the above mentioned rotation axis P (FIG. 8). Further, the photo transistors 172 and 182 are located between the LED chips 171 and 181, so that external light does not enter the photo transistors 172 and 182.

Figure 11:
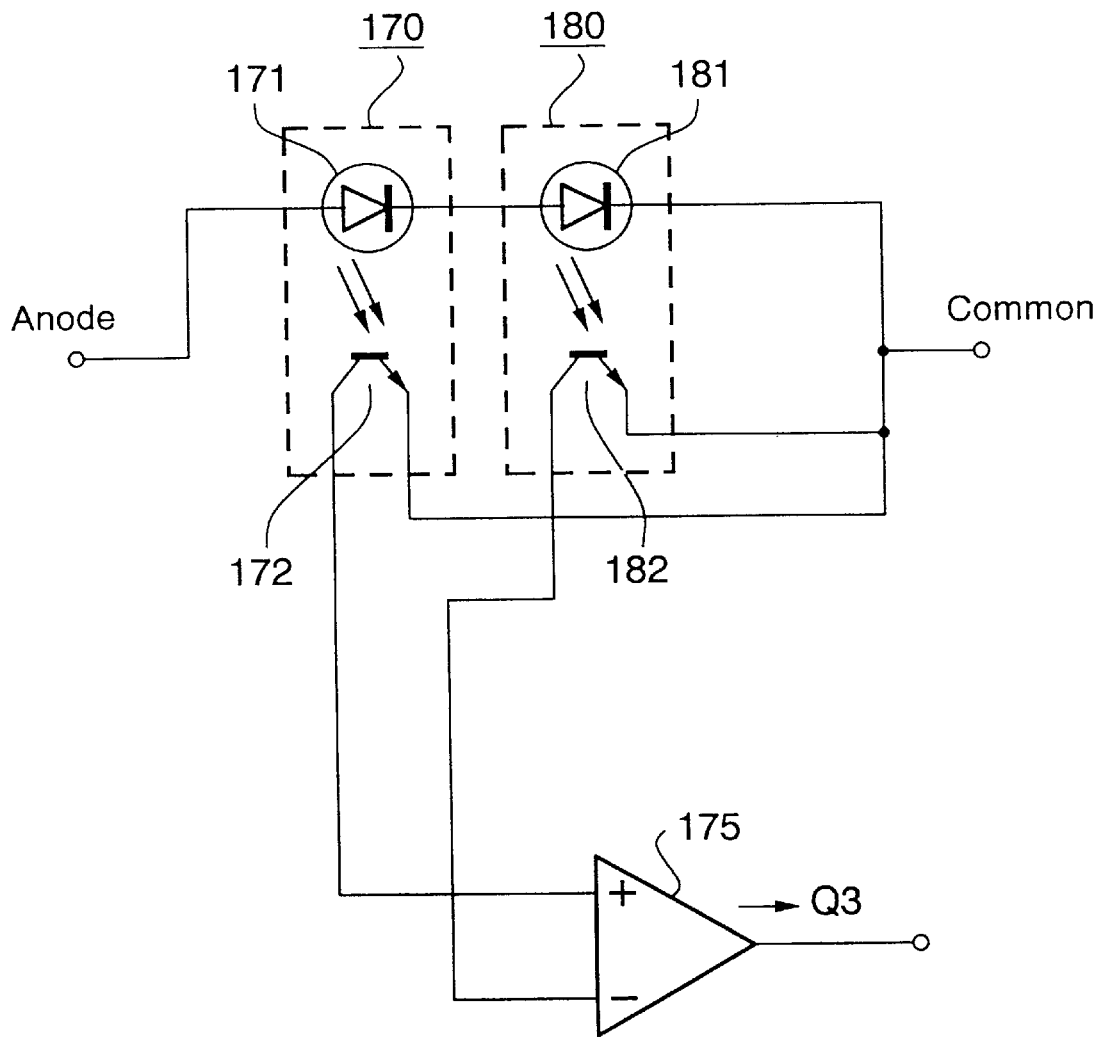
FIG. 11 is a circuit diagram of the galvano mirror system of FIG. 7.

FIG. 11 is a circuit diagram of the arrangement of the photo sensors 170 and 180. As shown in FIG. 11, the LED chips 171 and 181 are arranged in series with each other in such a manner that one terminal of the LED chip 171 is connected to an anode and one terminal of the LED chip 181 is connected to a common. That is, current applied to the LED chip 171 is the same as current applied to the LED chip 181. One terminal of the photo transistor 172 is connected to a plus end of a differentiate amplifier 175, while the other terminal thereof is connected to the common. One terminal of the photo transistor 182 is connected to a minus end of a differentiate amplifier 175, while the other terminal thereof is connected to the common. With this, the differentiate amplifier 175 emits an differentiate output Q3 corresponding to a difference between outputs of the photo transistors 172 and 182.

As shown in FIG. 9, light emitted by the LED chip 171 is reflected by the reflecting surface 135 and enters the photo transistor 172. Light emitted by the LED chip 181 is reflected by the reflecting surface 136 and enters the photo transistor 182. When the mirror holder 130 is rotated counterclockwise (in FIG. 9), the reflecting surface 135 is moved away from the photo sensor 170, while the reflecting surface 136 is moved toward the photo sensor 180. On the other hand, when the mirror holder 130 is rotated clockwise (in FIG. 9), the reflecting surface 135 is moved toward the photo sensor 170, while the reflecting surface 136 is moved away from the photo sensor 180. It causes a difference in the outputs of the photo transistors 172 and 182. Thus, the controller C is able to detect the rotational position of the mirror holder 130 according to the differentiate output Q3 outputted from the differentiate amplifier 175. Further, the controller C is able to recognize the direction of the rotation of the mirror holder 130 by comparing the outputs from the photo transistor 172 and 182.

Figure 12A:
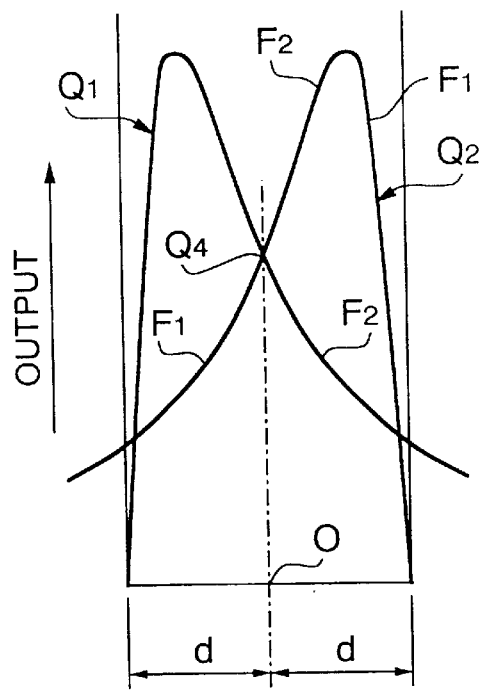
FIGS. 12A and 12B are diagrams respectively showing outputs of photo sensors and a differentiate amplifier.

FIG. 12A is a diagram showing an example of changes in outputs Q1 and Q2 of the photo transistors 172 and 182 when the mirror holder 130 is rotated. In FIG. 12A, the distance between the reflecting surface 135 (136) and the photo sensor 170 (180) are referred to as 'd'. The sensitivity of the photo transistor 172 is the same as that of the photo transistor 182. Since the positions of the photo sensors 170 and 180 are symmetrical about the center (including the rotation axis P) of the mirror holder 130, the outputs Q1 and Q2 of the photo transistor 172 and 182 show reversed phases with respect to each other.

Front end surfaces of the photo sensors 170 and 180 are aligned on a plane. An original position O of the mirror holder 130 is defined where the reflecting surfaces 135 and 136 are parallel to the plane of the photo sensors 170 and 180. The curves of the outputs Q1 and Q2 are symmetrical with each other about the original position O. The output Q1 has a peak when the distance d is a certain value. That is, the curve of the output Q1 includes slopes F1 and F2 on both sides of the peak. Similarly, the output Q2 has a peak when the distance d is a certain value.

In a particular arrangement, the distance d when the mirror holder 130 is positioned at the original position O is set to be 1 mm. In such case, each curve of the outputs Q1 and Q2 shows its peak when the distance d thereof is 0.5 mm. This value is obtained under the assumption that light-reflecting areas of the reflecting surfaces 135 and 136 are smaller than the light-receiving area of the photo transistors 172 and 182. In case where the areas of the light-reflecting surfaces 135 and 136 are relatively large, each curve of the outputs Q1 and Q2 shows its peak when the distance d is 0.7 to 1.0 mm.

Figure 12B:
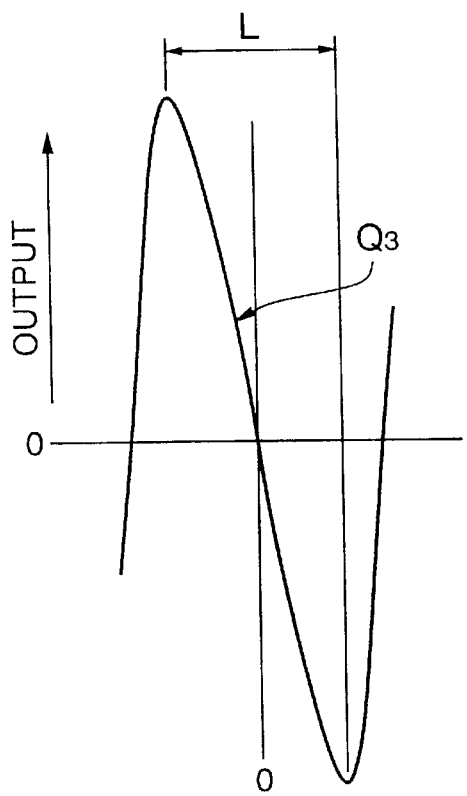

FIG. 12B is a diagram showing an differential output Q3. The output Q3 partially (shown by L) has a linearity, so that the linear region of the output Q3 can be used for detecting the rotational position of the mirror holder 130. When the outputs Q1 and Q2 are the same, the differential output Q3 is zero, which gives an original position of the mirror holder 130. The rotational position of the mirror holder 130 is detected based on the original position. In this embodiment, the rotational angle of the mirror holder 130 is within several degree. Thus, the reflecting surfaces 135 and 136 can be regarded to be substantially parallel to the photo sensors 170 and 180.

Figure 13:
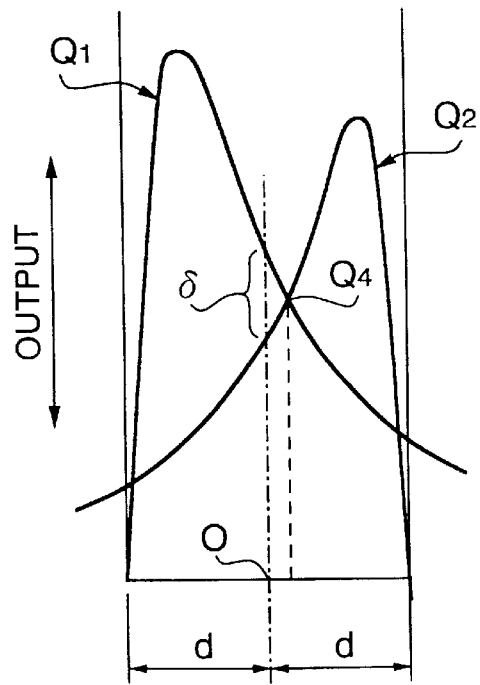
FIG. 13 is a diagram showing outputs of photo sensors.

There may be a difference in sensitivities of the photo transistors 172 and 182. In such case, the differential output Q3 ($\delta$) is not zero when the mirror holder 130 is positioned at the original position O as shown in FIG. 13. In such case, it is possible to laterally move the photo sensor holder 160 with respect to the stator 120 (while keeping the mirror holder 130 at the original position O) so that δ becomes zero. By moving the photo sensor holder 160 with respect to the stator 120, relative positions of the photo sensors 170 and 180 with respect to the reflecting surfaces 135 and 136 are varied. Thus, the amount of light reflected by the reflecting surface 135 and entering the photo transistor 172 and the amount of light reflected by the reflecting surface 136 and entering the photo transistor 182 are varied. With this, the differential output Q3 (δ) when the mirror holder 130 is positioned at the original position can be adjusted to zero.

According to the first embodiment, since the reflecting surfaces 135 and 136 are located to the rear side of the mirror holder 130, the photo sensors 170 and 180 can be located at the rear of the mirror holder 130. Thus, the arrangement of the photo sensors 170 and 180 do not occupy a large space, so that the galvano mirror system can be small in size and light in weight. Further, since the rotation of the mirror holder 130 is detected based on the differential output Q3 obtained from the output Q1 (the photo sensor 170) and the output Q2 (the photo sensors 180), the detection accuracy of the mirror holder 130 is relatively high. Furthermore, even if there is a difference in sensitivities of the photo transistors 172 and 182, the offset caused by the difference (in the sensitivities) can be easily removed by moving the photo sensor holder 160.

[Second Embodiment]

Figure 14:
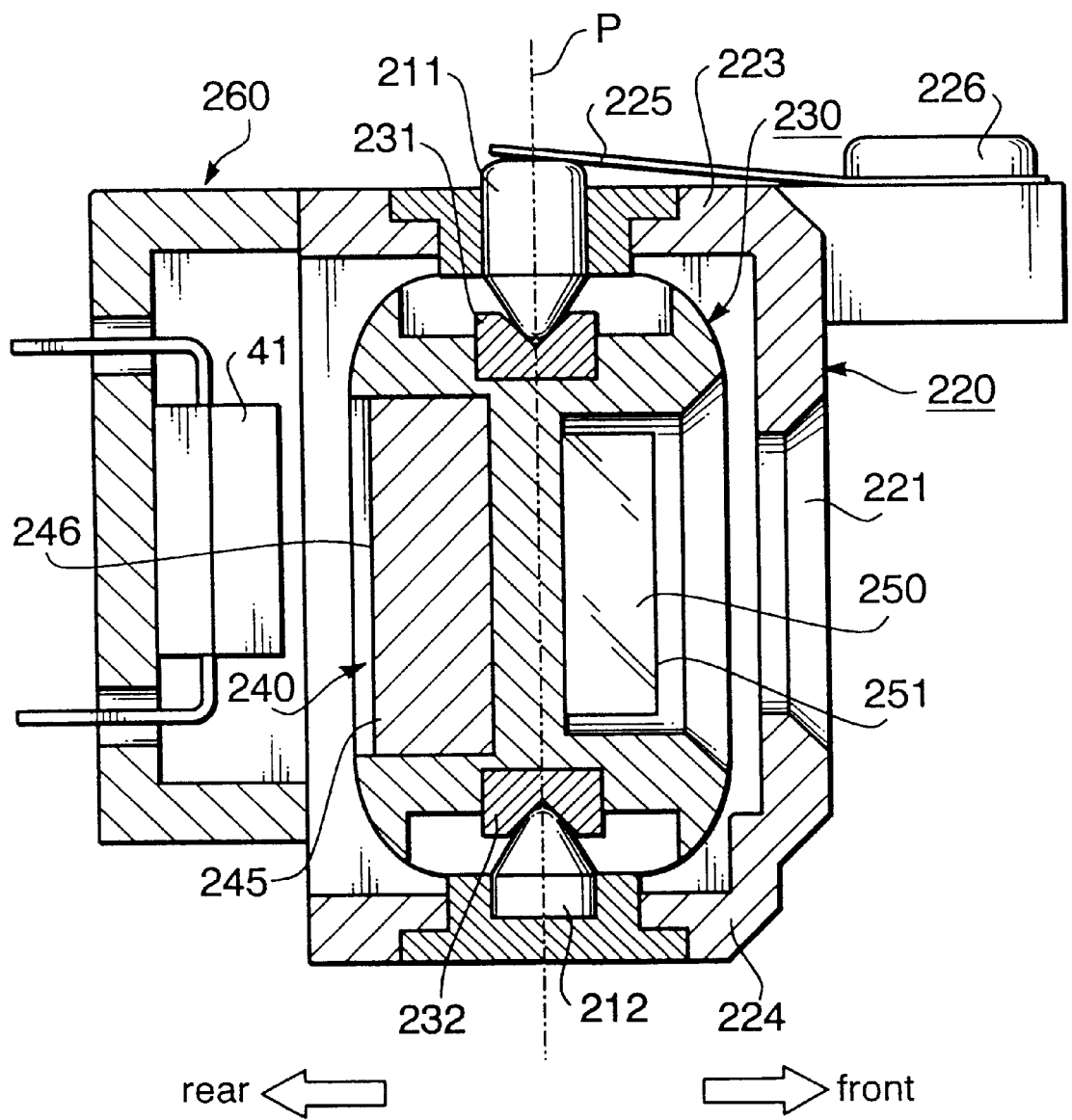
FIG. 14 is a sectional view of a galvano mirror system according to the second embodiment.
Figure 15:
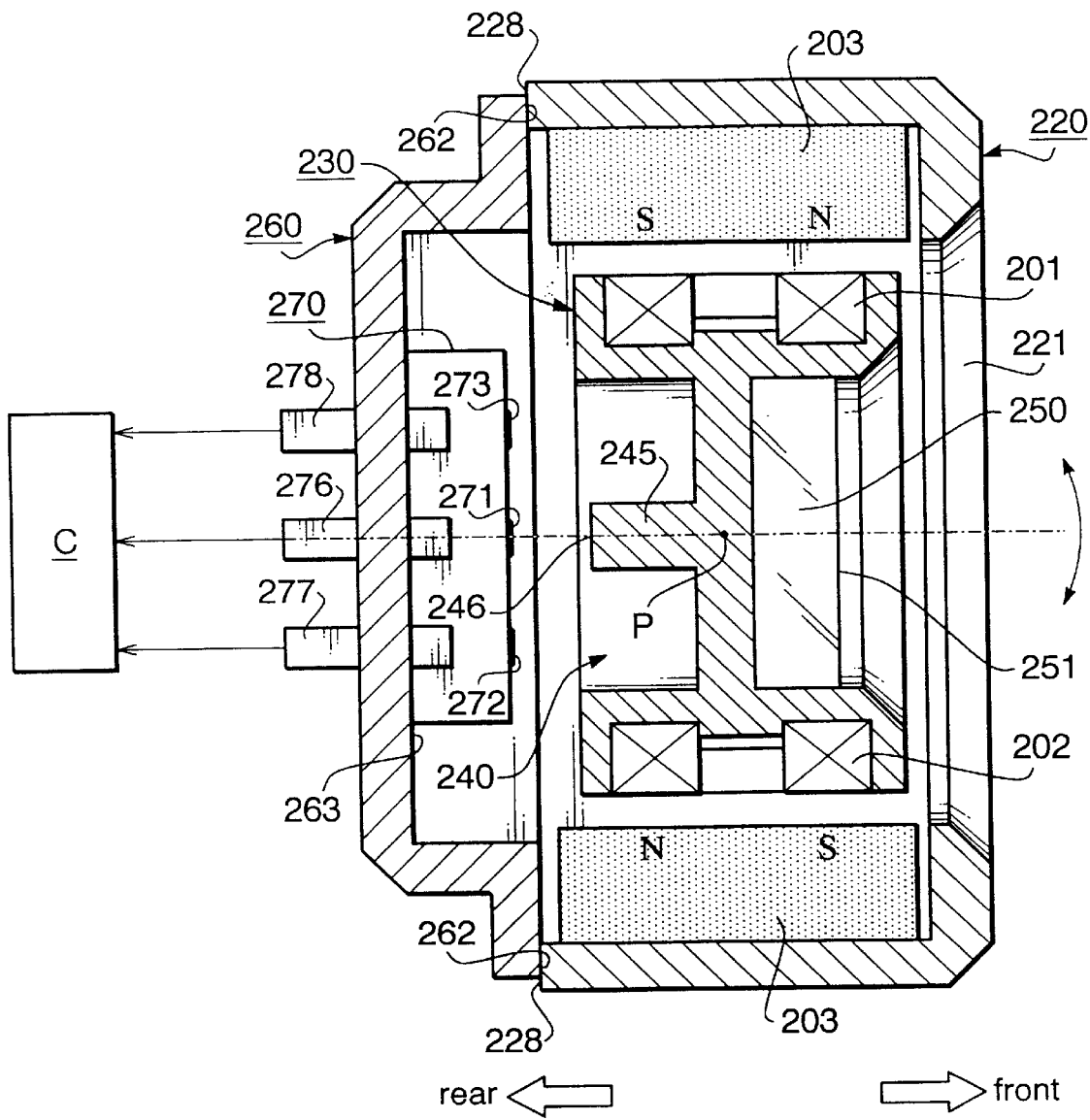
FIG. 15 is a plan sectional view of the galvano mirror system of, FIG. 14.

FIGS. 14 and 15 are a longitudinal sectional view and a horizontal sectional view of a galvano mirror system according to the second embodiment. As shown in FIG. 14, a galvano mirror 250 of the second embodiment is mounted to a mirror holder 230 rotatably supported in a stator 220. The stator 220 has an opening 221 at the front end thereof, which allows light (for data writing and data reading) to enter the front surface of the galvano mirror 250.

The stator 220 includes top and bottom plates 223 and 224. In order to rotatably support the mirror holder 230, center pins 211 and 212 are respectively provided to the top and bottom plates 223 and 224 of the stator 220. The center pins 211 and 212 are aligned on a line defining a rotation axis P of the mirror holder 230. The mirror holder 230 is provided with a pair of receive members 231 and 232 that respectively receive the center pins 211 and 212. That is, the mirror holder 230 is pivoted by the center pins 211 and 212 and the receive members 231 and 232. Each of the center pins 211 and 212 has a conical portion with a rounded apex. Each of the receive members 231 and 232 has conical surface. The mirror holder 230 is pivoted due to the contacts of the rounded apexes of the center pins 211 and 212 and the conical surfaces of the receive members 231 and 232. In order to eliminate backlash, a plate spring 225 is fixed to the top of the stator 220 (via a fixing screw 226), which biases the upper center pin 211 to the upper receive member 231.

As shown in FIG. 15, a pair of driving coils 201 and 202 are provided to the lateral side ends of the mirror holder 230. A pair of driving magnets 203 and 204 are provided to the stator 220 so that the driving magnets 203 and 204 are faced with the driving coils 201 and 202. By allowing current to flow in the driving coils 201 and 202, the mirror holder 230 is rotated about the rotation axis P due to the electromagnetic induction.

Figure 16:
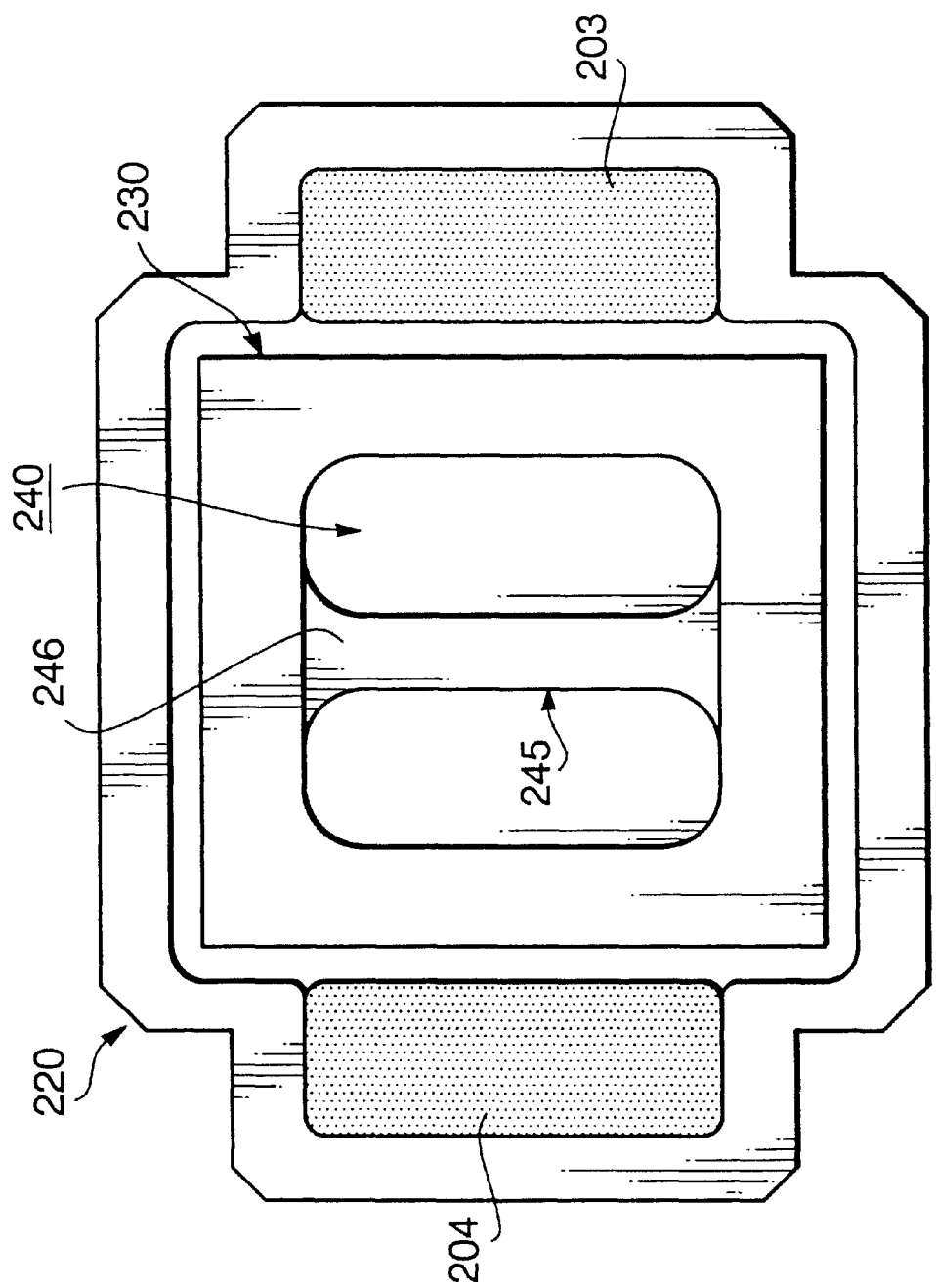
FIG. 16 is a rear view of the galvano mirror system of FIG. 14.

In order to decrease the weight of the mirror holder 230, a recess 240 is formed on the rear portion of the mirror holder 230. In order to increase the rigidity of the mirror holder 230, a lib 245 is formed in the recess 240 so that the lib 245 extends rearward from center of the mirror holder 230. FIG. 16 is a rear view of the galvano mirror system. A rear end surface 246 of the lib 245 is used as a reflecting surface which reflects the light from the photo sensor 270 described below.

Figure 17:
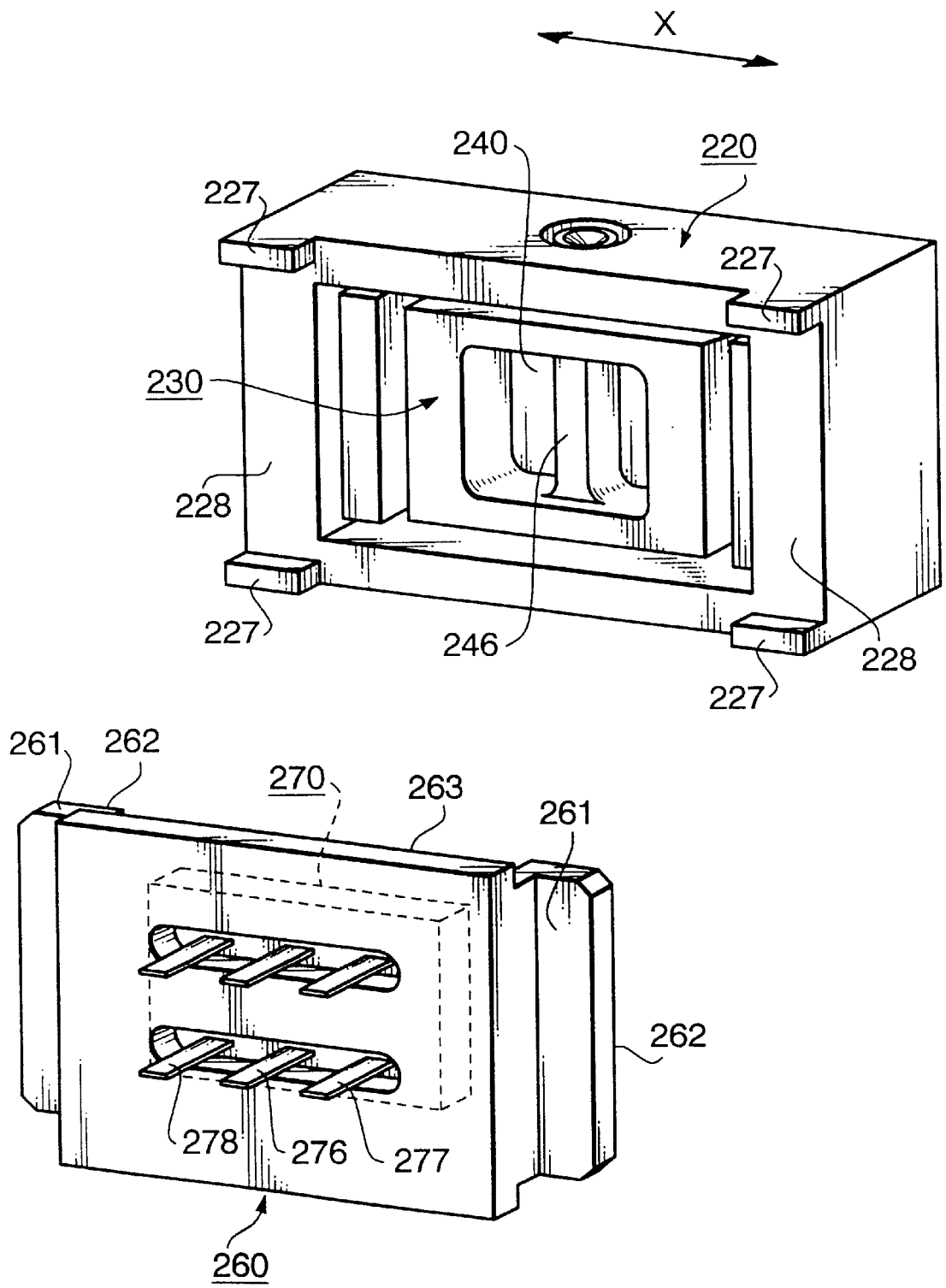
FIG. 17 is an exploded perspective view of the galvano mirror system of FIG. 14.

FIG. 17 is an exploded perspective view of the galvano mirror system. A photo sensor holder 260 is provided to the rear of the stator 220. The photo sensor holder 260 is provided with engaging walls 261 formed at both side ends thereof. The stator 220 is provided with four guide projections 227 projected rearward from the top and bottom of both lateral side ends thereof. When the photo sensor holder 260 is mounted to the stator 220, each engaging wall 261 is received by two guide projections 227. The photo sensor holder 260 has a pair of contact surfaces 262 which contacts the rear surfaces 228 of the stator 220. The contact surfaces 262 are parallel to the front surfaces of a photo sensor 270 (described below). Due to the slide contact of the contact surfaces 262 of the photo sensor holder 260 and the back surface 228 of the stator 220, the photo sensor holder 260 can be laterally moved with respect to the stator 220.

Figure 18:
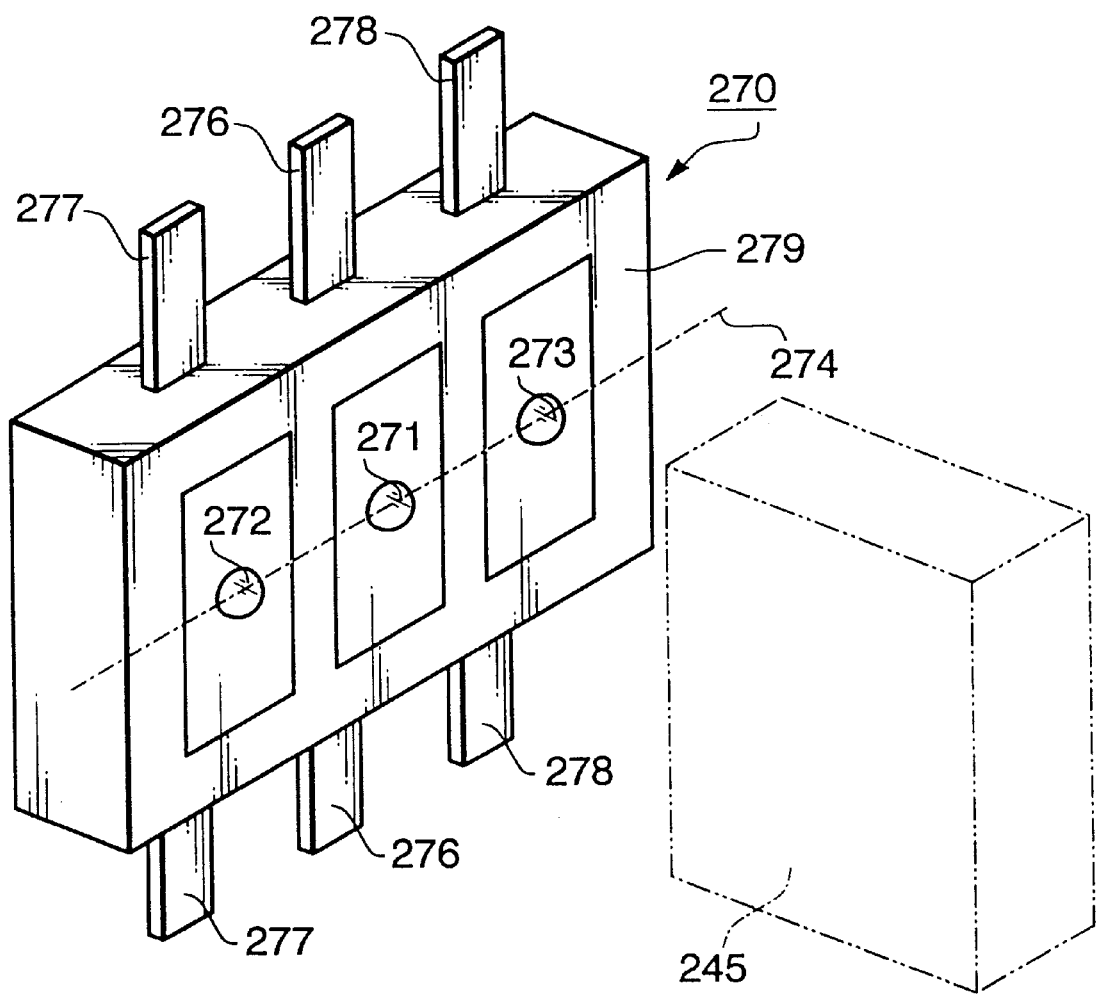
FIG. 18 is a perspective view of the galvano mirror system of FIG. 14.

A photo sensor 270 is provided on a front surface 263 of the photo sensor holder 260. FIG. 18 is a perspective view of the photo sensor 270. The photo sensor 270 has a LED chip 271 and two photo transistors 272 and 273 accommodated in a package 279. The LED chip 271 and the photo transistors 272 and 273 are disposed on a lateral line 274 so that the photo transistors 272 and 273 laterally sandwich the LED chip 271. The LED chip 271 and the photo transistors 272 and 273 are aligned on a same plane.

As shown in FIG. 15, when the photo sensor holder 260 is mounted to the stator 220, the photo sensor 270 is faced with the reflecting surface 246 of the mirror holder 230. In this state, the center line 274 of the photo sensor 270 is perpendicular to the rotational axis of the mirror holder 230. The LED chip 271 and the photo transistors 272 and 273 are connected to a controller via connecting members 276, 277 and 278 and not shown wires. As shown in FIG. 17, connecting members 276, 277 and 278 are rearward extended to the exterior through a pair of openings formed on the photo sensor holder 260.

Figure 19:
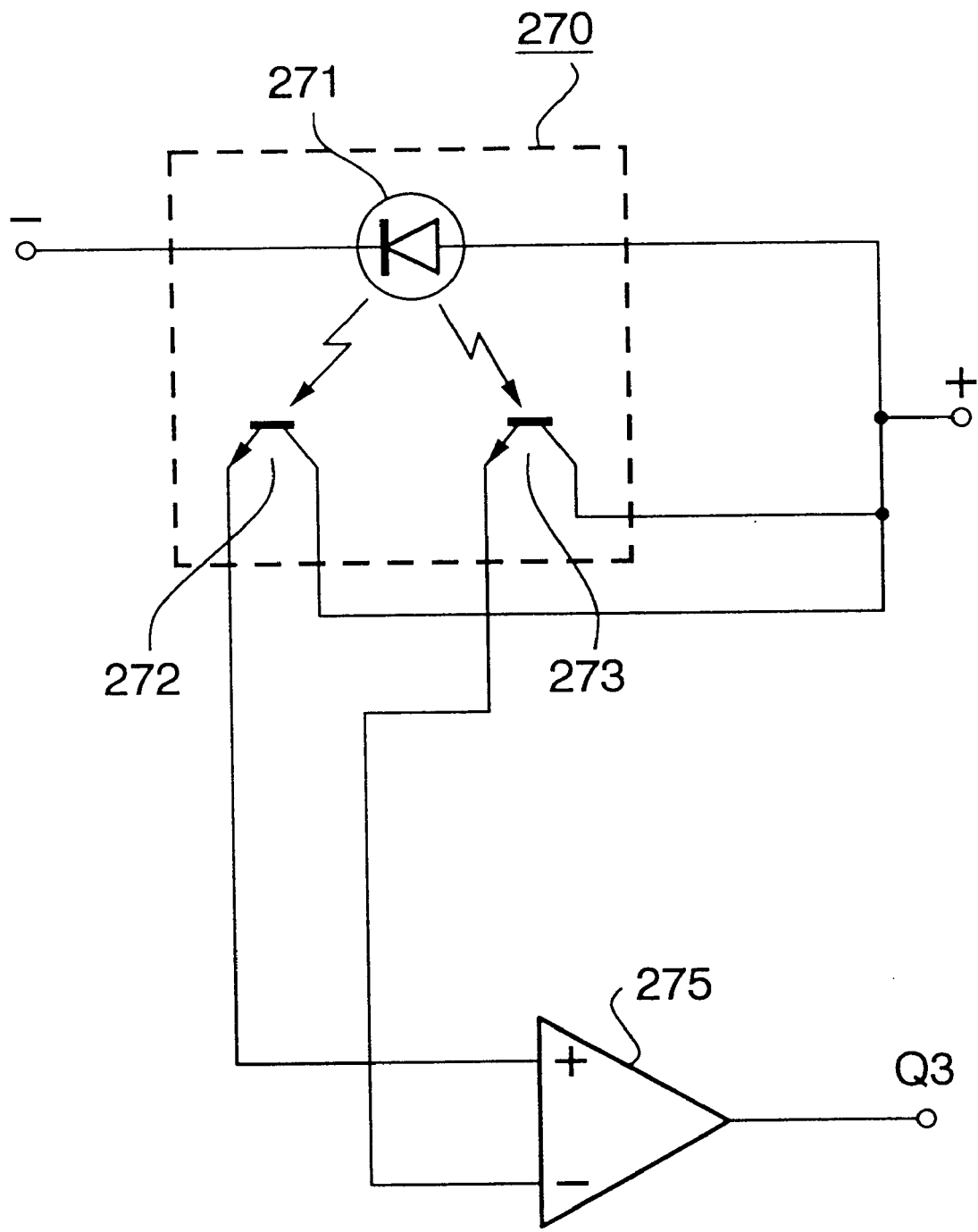
FIG. 19 is a circuit diagram of the galvano mirror system of FIG. 14.

FIG. 19 is a circuit diagram of the arrangement of the photo sensor 270. As shown in FIG. 19, an anode terminal of the LED chip 271 is connected to a plus terminal of a power supply (not shown), while a cathode terminal of the LED chip 271 is connected to a minus terminal of the power supply. Collectors of the photo transistors 272 and 273 are connected to the plus terminal of the power supply. An emitter of the photo transistor 272 is connected to a plus terminal of a differentiate amplifier 275, while an emitter of the photo transistor 273 is connected to a minus terminal of the differentiate amplifier 275.

With this, the differentiate amplifier 275 outputs an differentiate output Q3 corresponding to a difference in outputs of the photo transistor 272 and 273. As shown in FIG. 15, light emitted by the LED chip 271 is reflected by the reflecting surface 246 and enters the photo transistors 272 and 273. When the mirror holder 230 is rotated, the reflecting surface 246 is moved toward one of the photo transistors 272 and 273. When the reflecting surface 246 is moved toward the photo transistor 272, the amount of light received by the photo transistor 272 is increased, while the amount of light received by the photo transistor 273 is decreased. When the reflecting surface 246 is moved toward the photo transistor 273, the amount of light received by the photo transistor 273 is increased, while the amount of light received by the photo transistor 272 is decreased. It causes a difference between the outputs Q1 and Q2 from the photo transistors 272 and 273. Thus, the controller C detects the rotational position of the mirror holder 230 according to the differentiate output Q3 outputted from the differentiate amplifier 275. Further, the direction of the rotation of the mirror holder 230 is recognized by comparing the outputs from the photo transistors 272 and 273.

Figure 20A:
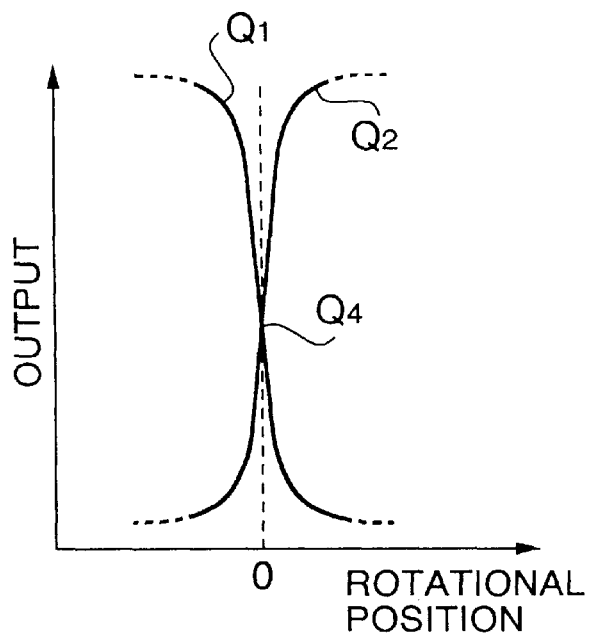
FIGS. 20A and 20B are diagrams respectively showing outputs of photo sensors and a differentiate amplifier.

FIG. 20A is a diagram showing an example of changes in outputs Q1 and Q2 of the photo transistors 272 and 273 when the mirror holder 230 is rotated. The sensitivity of the photo transistors 272 and 273 are the same with each other. An original position O of the mirror holder 230 is defined where the front surface of the photo sensor 270 is parallel to the reflecting surface 246. The shapes of the curves Q1 and Q2 are symmetrical with each other about the original position O.

Figure 20B:
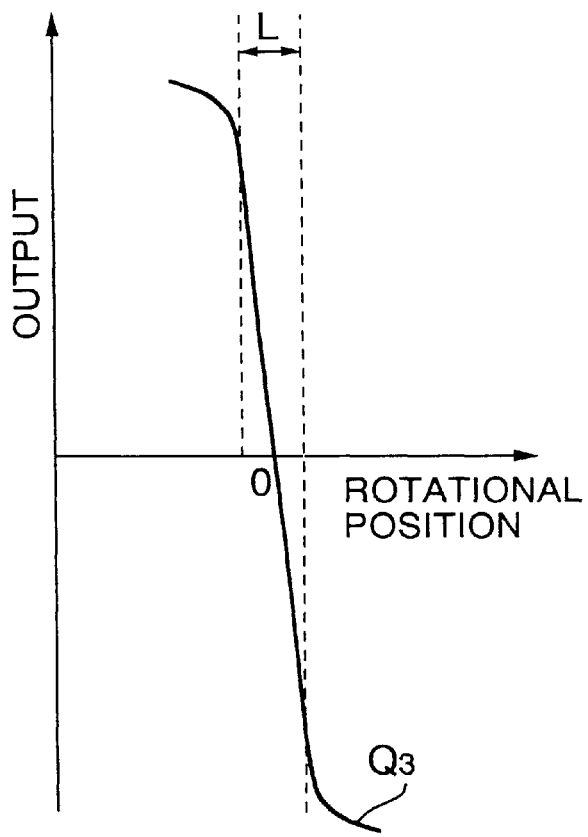

FIG. 20B is a diagram showing an differential output Q3. The output Q3 partially (shown by L) has a linearity, so that this linear region of the output Q3 is used for detecting the rotational position of the mirror holder 230. When the outputs Q1 and Q2 are the same, the differential output Q3 is zero, the controller C recognizes that the mirror holder 230 is positioned at the original position O. The rotational position of the mirror holder 230 is detected based on the original position. In this embodiment, the rotating amount of the mirror holder 230 is within several degree. Thus, the reflecting surface 246 and the photo sensors 272 and 273 are substantially parallel with each other when the mirror holder 230 is rotated.

Figure 21A:
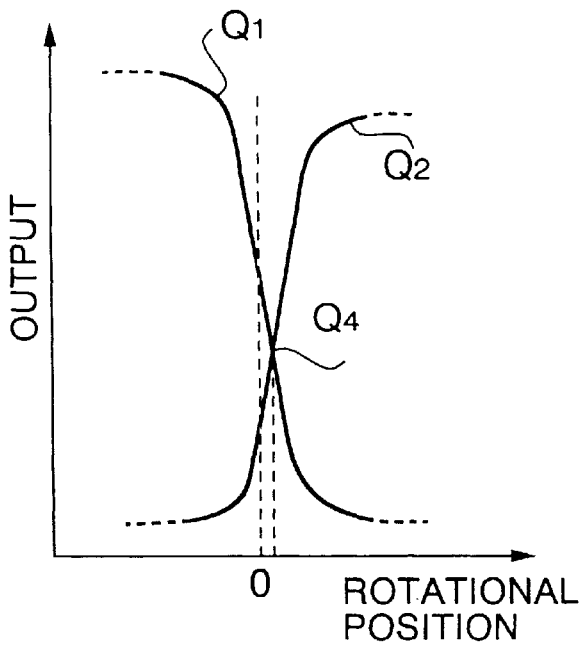
Figure 21B:
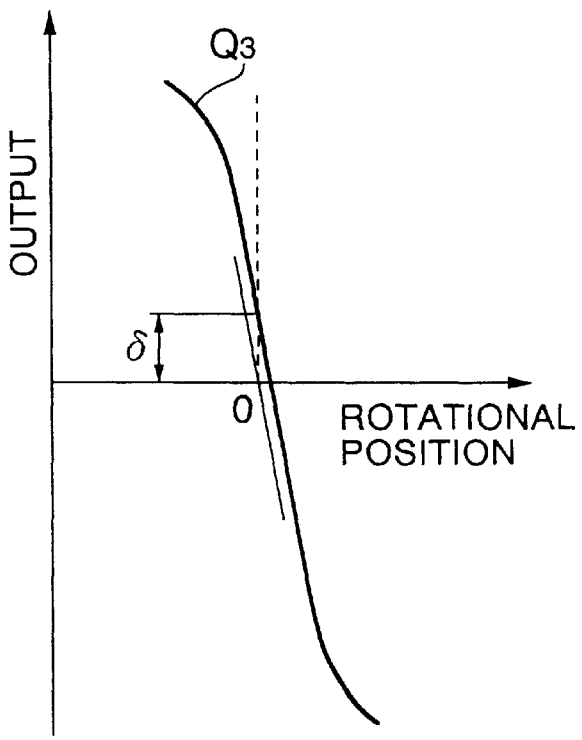

FIG. 21A is a diagram showing outputs Q1 and Q2 of the photo sensors 272 and 273 in case there is a difference in sensitivities of the photo sensors 272 and 273. In such case, the differential output Q3 (δ) is not zero when the mirror holder 230 is positioned at the original position O. Like the first embodiment, it is possible to laterally move the photo sensor holder 260 with respect to the stator 220 so that δ becomes zero. As the photo sensor holder 260 is laterally moved, the amount of light reflected by the reflecting surface 246 and entering the photo sensor 272 and 273 are changed. With this, the differential output δ (when the mirror holder 230 is positioned at the original position) can be changed to zero.

According to the second embodiment, since the reflecting surface 246 is formed on the lib 246, and since the photo sensor 270 is located at the rear of the mirror holder 230, the photo sensor 270 does not occupy a large space. Accordingly, the galvano mirror system can be small in size and light in weight. Further, even if there is a difference in sensitivities of the photo transistors 272 and 273, the offset caused by the difference (in the sensitivities) can be easily removed by moving the photo sensor holder 260.

[Third Embodiment]

Figure 22:
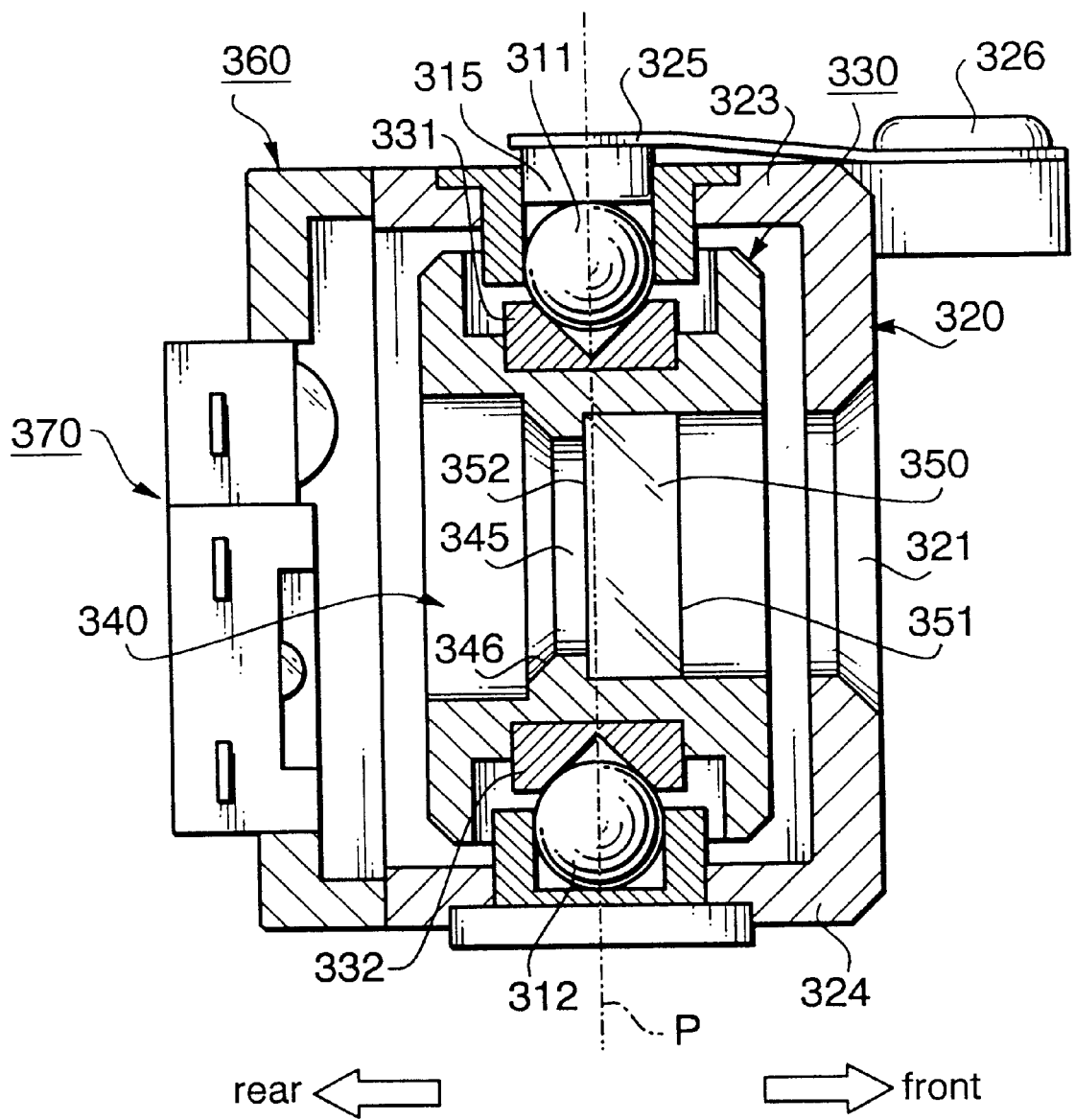
FIG. 22 is a longitudinal sectional view of a galvano mirror system according to the third embodiment.
Figure 23:
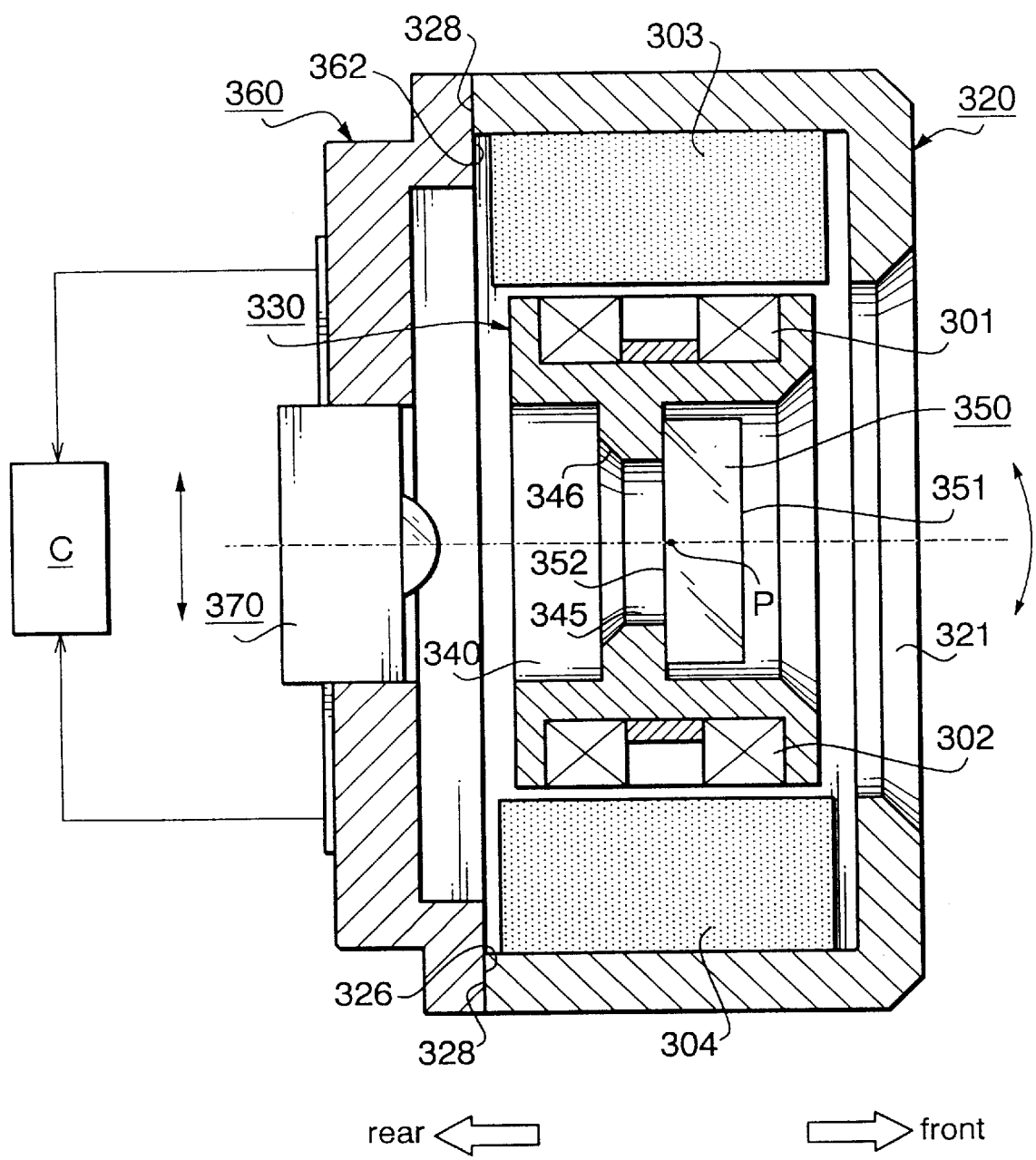
FIG. 23 is a horizontal sectional view of the galvano mirror system of FIG. 22.

FIGS. 22 and 23 are a longitudinal sectional view and a horizontal sectional view of a galvano mirror system according to the third embodiment. As shown in FIG. 22, a galvano mirror 350 is mounted to a mirror holder 330 that is rotatably supported in a stator 320. The galvano mirror 350 has parallel front and rear surfaces 351 and 352. The stator 320 has an opening 321 at the front end thereof, which allows light (for data writing and data reading) to enter the front surface 351 of the galvano mirror 350. The stator 320 includes top and bottom plates 323 and 324. In order to rotatably support the mirror holder 330, a pair of center balls 311 and 302 are provided to the top and bottom plates 323 and 324 so that the center balls 311 and 312 sandwich the mirror holder 330. The mirror holder 330 is provided with a pair of receive members 331 and 332 which receive the center balls 311 and 312, respectively. The receive members 331 and 332 have conical surfaces to which the center balls 311 and 312 contact. A plate spring 325 is provided to the top of the stator 320 (by a fixing screw 326), which urges the upper center ball 311 downward via an intermediate block 315. With this, the mirror holder 330 is pivoted by the center balls 311 and 312 and the receive members 331 and 332.

As shown in FIG. 23, a pair of driving coils 301 and 302 are provided to the lateral side ends of the mirror holder 330. A pair of driving magnets 303 and 304 are provided to the stator 320 so that the driving magnets 303 and 304 are faced with the driving coils 301 and 302. By allowing current to flow in the driving coils 301 and 302, the mirror holder 330 is rotated about the rotation axis P due to an electromagnetic induction.

A recess 340 is formed on the rear portion of the mirror holder 330. A window 345 is formed at a center portion of the mirror holder 330 so that a rear surface 352 of the galvano mirror 350 is exposed to the recess 340 via the window 345. A tapered edge 346 is formed at the rear side of the periphery of the window 345.

Figure 24:
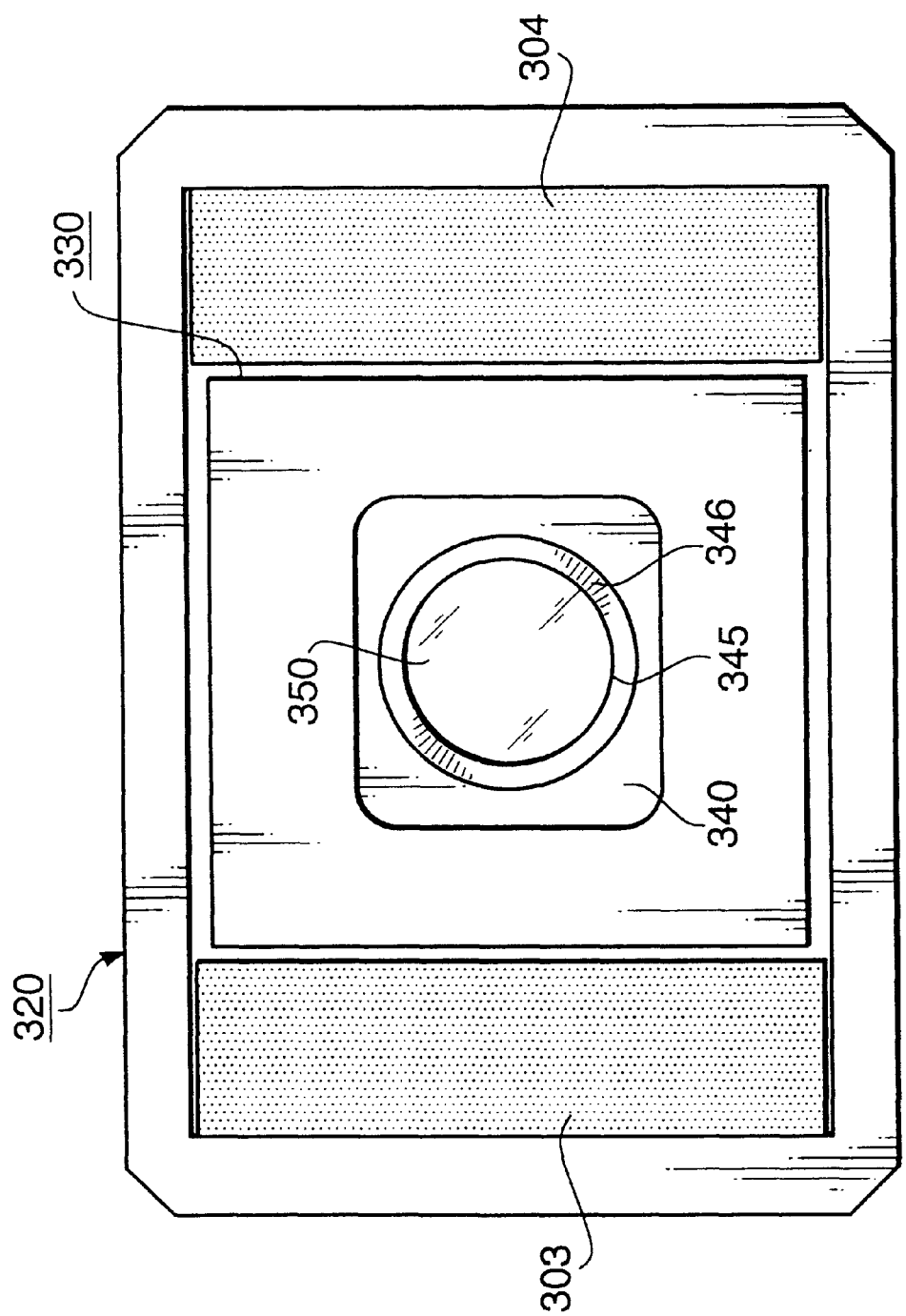
FIG. 24 is a rear view of the galvano mirror system of FIG. 22.

FIG. 24 is a rear view of the mirror holder 330. A coating is applied onto the rear surface 352 of the galvano mirror 350, which reflects light emitted from a photo sensor 370 described below. Alternatively, it is possible to attach a white tape or to paint a white material on the rear surface of the galvano mirror 350.

Figure 25:
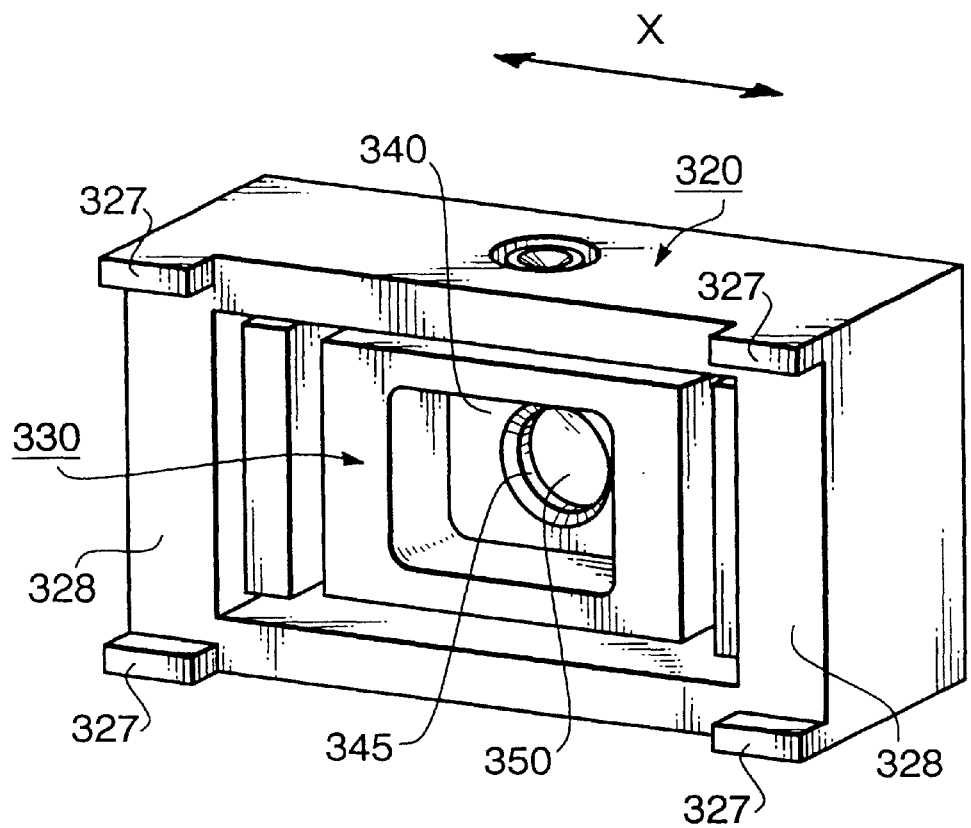
FIG. 25 is an exploded perspective view of the galvano mirror system of FIG. 22.
Figure 25:
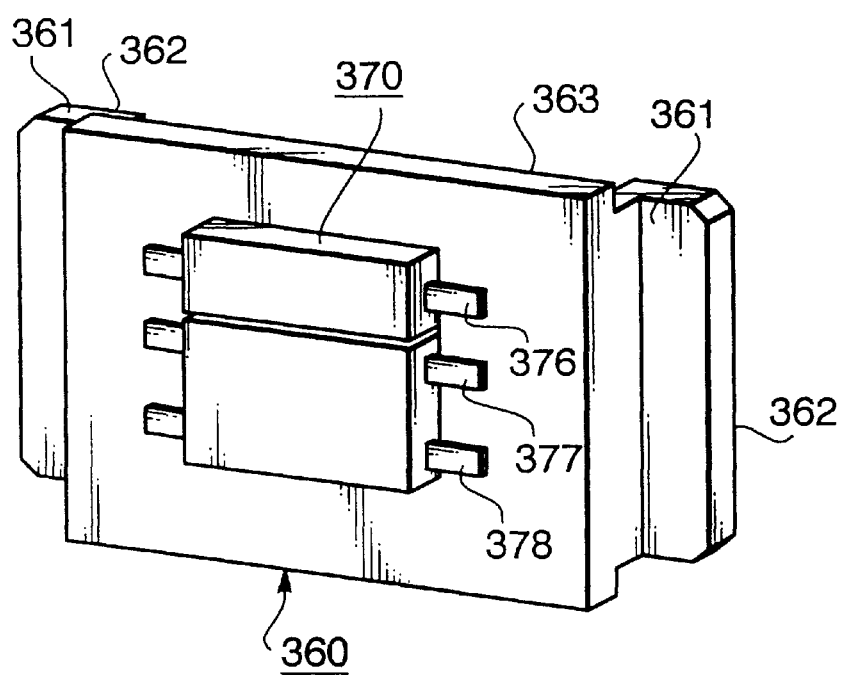
Figure 26:
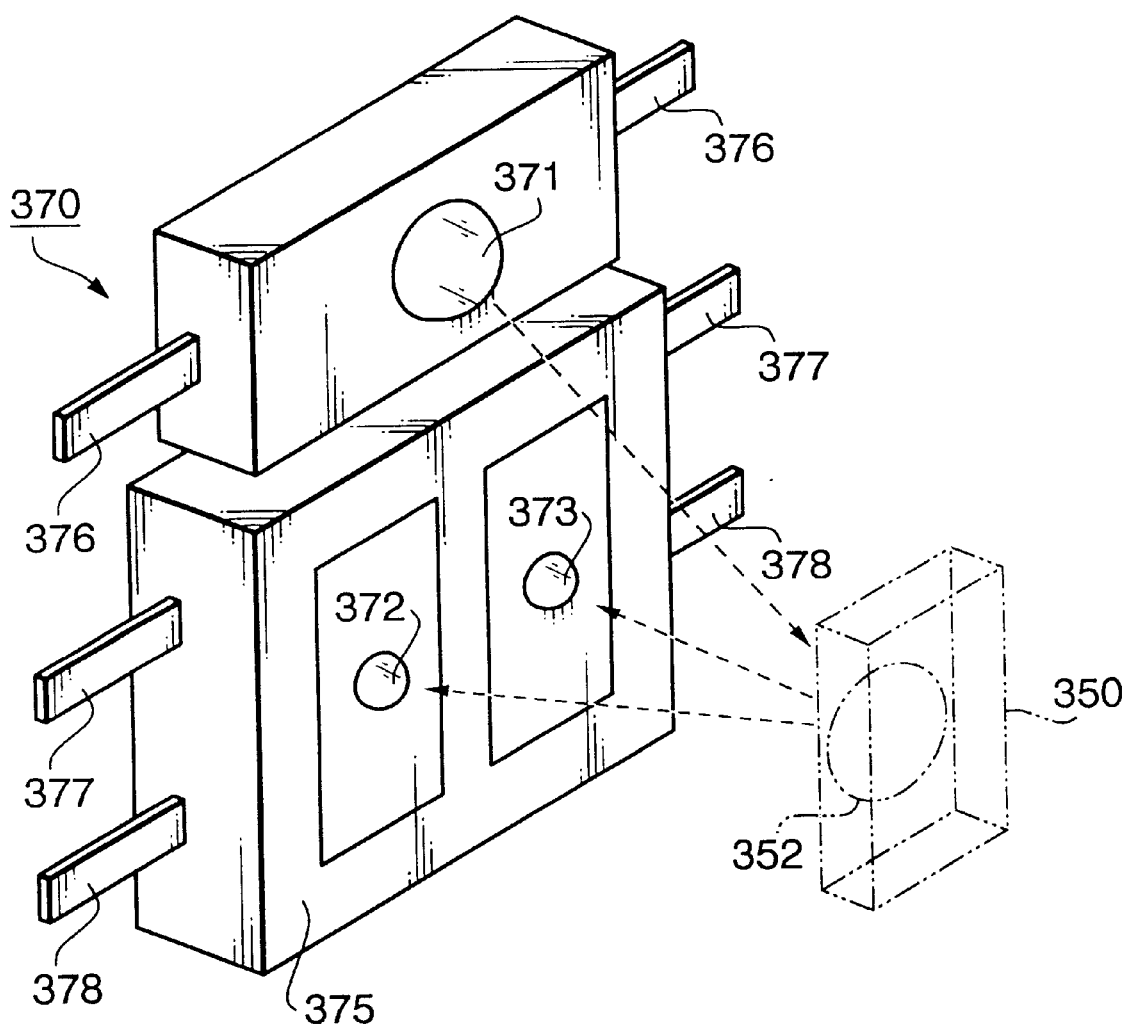
FIG. 26 is a perspective view of the photo sensor of FIG. 14.

FIG. 25 is an exploded perspective view of the galvano mirror system. A photo sensor holder 360 is provided to the rear portion of the stator 320. A photo sensor 370 is provided to a front surface 363 of the photo sensor holder 360. FIG. 26 is a perspective view of the photo sensor 370. The photo sensor 370 includes an LED chip 371 and two photo transistors 372 and 373. The photo transistors 372 and 373 are laterally disposed and accommodated in a package 375. The LED chip 371 is located above the package. The lateral position of the LED chip 371 corresponds to the middle of the photo transistors 372 and 373. The LED chip 371 and the photo transistors 372 and 373 are aligned on a same plane. The LED chip 371 and the photo transistors 372 and 373 are connected to a controller C via connecting members 376, 377 and 378 and not shown wires.

Since the circuit diagram of the photo sensor 370 is the same as that of the photo sensor 270 of the second embodiment (FIG. 19), the detailed description thereof is omitted.

The photo sensor holder 360 is provided with engaging walls 361 formed at both side ends thereof. The stator 320 is provided with four guide projections 327 projected rearward from the top and bottom of both lateral ends thereof. When the photo sensor holder 360 is mounted to the stator 320, each engaging wall 361 is received by two guide projections 327. The photo sensor holder 360 has a pair of contact surfaces 362 which contacts the rear surfaces 328 of the stator 320. The contact surfaces 362 are parallel to the front surfaces of the LED chip 371 and two photo transistors 372 and 373. Due to the slide contact of the contact surfaces 362 of the photo sensor holder 360 and the back surface 328 of the stator 320, the photo sensor holder 360 can be laterally moved with respect to the stator 320.

When the mirror holder 330 is rotated, the reflecting surface 352 is directed toward one of the photo transistors 372 and 373. When the reflecting surface 352 is directed toward the photo transistor 372, the amount of light received by the photo transistor 372 is increased, while the amount of light received by the photo transistor 373 is decreased. When the reflecting surface 352 is directed toward the photo transistor 373, the amount of light received by the photo transistor 373 is increased, while the amount of light received by the photo transistor 372 is decreased. It causes a difference between outputs Q1 and Q2 of the photo transistors 372 and 373. Thus, like the second embodiment, the controller C is able to detect the rotational position of the mirror holder 330 according to the differentiate output Q3 corresponding to the difference in the outputs Q1 and Q2. Further, like the second embodiment, even if there is a difference of sensitivities of the photo transistors 372 and 373, the offset caused by the difference can be easily removed by laterally moving the photo sensor holder 360 with respect to the stator 320.

According to the third embodiment, since the reflecting surface 352 is formed on the rear surface of the galvano mirror 350, and since the photo sensor 370 is located at the rear of the mirror holder 330, the arrangement of the photo sensor 370 does not occupy a large space. Thus, the galvano mirror system can be small in size and light in weight.

In the third embodiment, if a direction characteristics of the LED chip 371 is narrow, the interval between the photo transistors 372 and 373 can be narrowed. In such case, the galvano mirror system can be further compact.

Alternatively, it is also possible to provide the LED chip 371 below the photo transistors 372 and 373. Further, it is possible to accommodate the LED chip 371 and the photo transistors 372 and 373 in one package. Furthermore, the window 345 can be of any shape (for example, square).

Figure 27:
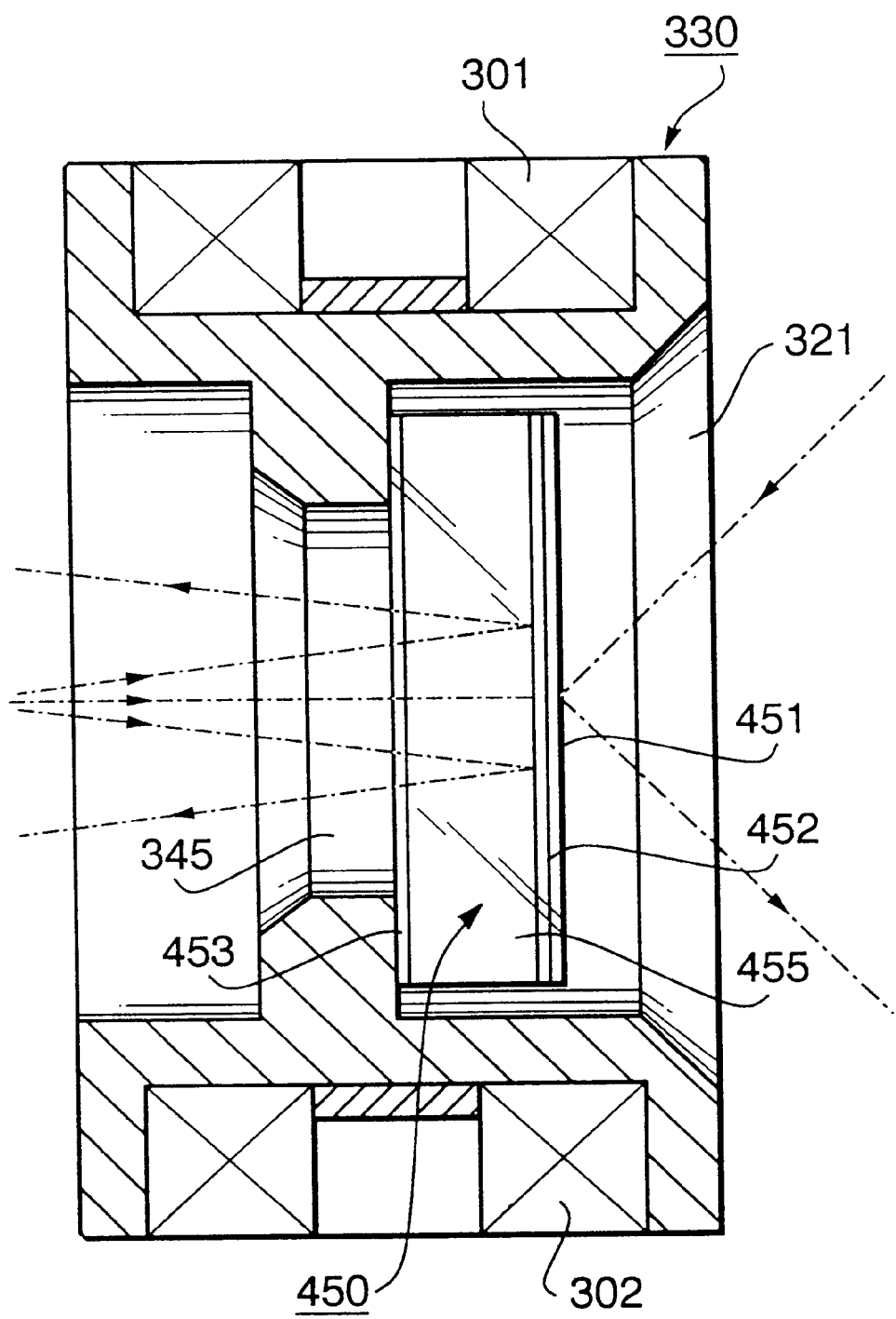
FIG. 27 is a horizontal sectional view of a galvano mirror system according to a modification of the third embodiment.

FIG. 27 is a horizontal sectional view of the mirror holder 330 according to a modification of the third embodiment. The structure of the mirror holder 330 is the same as the third embodiment. In this modification, the galvano mirror 450 includes a mirror body 455 and first and second layers 451 and 452 formed on the front surface of the mirror body 455. The mirror body 455 is made of material which allows the LED to transmit therethrough. The first layer 451 reflects the laser beam for data writing and data reading, while the second layer 452 reflects the LED emitted from the photo sensor 370 (FIG. 26). A back layer 453 is formed at the rear surface of the mirror body 455, which allows the LED to transmit therethrough. With this, LED emitted from the photo sensor 370 (FIG. 26) proceeds through the back layer 453 and the mirror body 455 and reflected by a rear surface of the second layer 452. The LED reflected by the second layer 452 further proceeds through the mirror body 455 and the back layer 453 to enter the photo transistors 372 and 373 (FIG. 26).

With such an arrangement, a distance between the photo sensor 370 and the reflecting surface can be set longer than the third embodiment. Thus, when the mirror holder is rotated, the swinging amount of the reflected LED is larger than the third embodiment. That is, the accuracy in detecting the rotating angle of the mirror holder is increased.

Although the structure and operation of a galvano mirror system is described herein with respect to the preferred embodiments, many modifications and changes can be made without departing from the spirit and scope of the invention. Particularly, the embodiments can be embodied in any kind of optical disk drive and are not limited to the optical disk drive using the Near Field Recording technology.

The present disclosure relates to subject matters contained in Japanese Patent Application No. HEI 09-172063 filed on Jun. 27, 1997 and Japanese Patent Application Nos. HEI 09-281550 and HEI 09-281551, filed on October 15, which are expressly incorporated herein by reference in their entirety.

What is claimed is:

1. A galvano mirror system, comprising:
  a galvano mirror having a mirror surface that reflects light for at least one of data reading and data writing;
  a mirror holder having a front portion to which said galvano mirror is mounted, and a rear portion opposing said front portion;
  a stator that rotatably supports said holder;
  a first reflecting surface;
  a second reflecting surface, said first reflecting surface and said second reflecting surface being associated with said rear portion of said mirror holder;
  a first photo sensor;
  a second photo sensor, said first photo sensor and said second photo sensor being associated with said stator, such that said first photo sensor faces said first reflecting surface and said second photo sensor faces said second reflecting surface, said first photo sensor and said second photo sensor each comprising a light-emitting device and a light-receiving device;
  a controller that deflects a rotation of said mirror holder according to a difference in output between said light-receiving device of said first photo sensor and said light-receiving device of said second photo sensor, wherein a recess is formed at said rear portion of said mirror holder, said first reflecting surface and said second reflecting surface being formed on both sides of said recess.

2. The galvano mirror system of claim 1, said sensor holder having at least one contact surface that contacts said stator.

3. The galvano mirror system of claim 2, said light-emitting device and said light-receiving device of said first photo sensor, and said light-emitting device and said light-receiving device of said second photo sensor, are aligned in a predetermined plane parallel to said at least contact surface.

4. The galvano mirror system of claim 3, wherein an original position of said mirror holder is defined when said first reflecting surface and said second reflecting surface are parallel to said plane.

5. A galvano mirror system, comprising:
  a galvano mirror;
  a mirror holder having a front portion to which said galvano mirror is mounted, and a rear portion opposing said front portion;
  a stator that rotatably supports said mirror holder;
  a reflecting surface associated with said rear portion of said mirror holder, a recess being formed at said rear portion of said mirror holder, said reflecting surface being formed on an end surface of a lib formed in said recess;
  a photo sensor associated with said stator, such that said photo sensor faces said reflecting surface, said photo sensor comprising a light-emitting device and two light-receiving devices; and
  a controller that detects a rotation of said mirror holder according to a difference in output between said two light-receiving devices.

6. The galvano mirror system of claim 5, wherein said two light-receiving devices are disposed in a certain direction perpendicular to a rotational axis of said mirror holder.

7. The galvano mirror system of claim 6, wherein said photo sensor is fixed to a sensor holder mounted to said stator.

8. The galvano mirror system of claim 7, wherein a position of said sensor holder is adjusted in said certain direction.

9. The galvano mirror system of claim 8, wherein said sensor holder includes a contact surface that contacts said stator.

* * * * *